United States Patent
Takaku et al.

(10) Patent No.: US 10,619,060 B2
(45) Date of Patent: Apr. 14, 2020

(54) ACTINIC RADIATION CURABLE INKJET INK, INKJET IMAGE FORMING METHOD, AND RECORDING MEDIUM ON WHICH IMAGE HAS BEEN FORMED USING INKJET INK

(71) Applicant: Konica Minolta, Inc., Chiyoda-ku, Tokyo (JP)

(72) Inventors: Yusuke Takaku, Tokyo (JP); Ken Nito, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/535,762

(22) PCT Filed: Dec. 10, 2015

(86) PCT No.: PCT/JP2015/084636
§ 371 (c)(1),
(2) Date: Jun. 14, 2017

(87) PCT Pub. No.: WO2016/098678
PCT Pub. Date: Jun. 23, 2016

(65) Prior Publication Data
US 2017/0342283 A1 Nov. 30, 2017

(30) Foreign Application Priority Data
Dec. 15, 2014 (JP) .................. 2014-253207

(51) Int. Cl.
| | |
|---|---|
| *B41J 11/00* | (2006.01) |
| *C09D 11/101* | (2014.01) |
| *B41J 2/21* | (2006.01) |
| *B41M 5/00* | (2006.01) |
| *C09D 11/38* | (2014.01) |
| *B41M 7/00* | (2006.01) |
| *B41M 5/50* | (2006.01) |
| *C09D 11/322* | (2014.01) |

(52) U.S. Cl.
CPC ............ *C09D 11/101* (2013.01); *B41J 2/21* (2013.01); *B41J 11/002* (2013.01); *B41M 5/00* (2013.01); *B41M 5/50* (2013.01); *B41M 7/0081* (2013.01); *C09D 11/322* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

2010/0221510 A1 * 9/2010 Odell .................. C09D 11/101 347/102
2013/0307913 A1 * 11/2013 Kawashima ........... B41J 2/2107 347/100

FOREIGN PATENT DOCUMENTS

| EP | 2796517 A1 * | 10/2014 | ........... C09D 11/101 |
| JP | 2009041015 A1 | 2/2009 | |
| WO | 2013046699 A1 | 4/2013 | |
| WO | WO-2013094198 A1 * | 6/2013 | ........... C09D 11/101 |
| WO | 2016098678 A1 | 6/2016 | |

OTHER PUBLICATIONS

International Search Report corresponding to Application No. PCT/JP2015/084636; dated Mar. 15, 2016.
Written Opinion of the International Searching Authority corresponding to Application No. PCT/JP2015/084636; dated Mar. 15, 2016.
JPO Notice of Reasons for Refusal corresponding to JP2016-564817 dated Jul. 2, 2019.
JPO Notice of Reasons for Refusal corresponding to JP2016-564817 dated Feb. 12, 2020.

* cited by examiner

*Primary Examiner* — Manish S Shah
(74) *Attorney, Agent, or Firm* — Cantor Colburn LLLP

(57) ABSTRACT

The purpose of the present invention is to provide an actinic radiation curable inkjet ink which has less color mixing, which can obtain white ink with fewer surface irregularities and excellent smoothness, which has excellent actinic radiation transmittance and curability, and which enables sol-gel phase transition by temperature change, and to provide an inkjet image forming method, and a recording medium on which an image has been formed using the inkjet ink. This purpose is achieved by an actinic radiation curable inkjet ink that contains a photopolymerizable compound, a photo initiator, a gelling agent, and a white pigment, wherein the white pigment contains titanium oxide, the gelling agent contains at least one type of gelling agent A that contains an alkyl chain comprising a straight chain portion with 12-26 carbon atoms, wherein the content of the gelling agent A is 5-35 mass % of the content of the titanium oxide.

8 Claims, 5 Drawing Sheets

ACTINIC RADIATION CURABLE INKJET INK, INKJET IMAGE FORMING METHOD, AND RECORDING MEDIUM ON WHICH IMAGE HAS BEEN FORMED USING INKJET INK

CROSS REFERENCE TO RELATED APPLICATIONS

This is the U.S. national stage of application No. PCT/JP2015/084636 filed on Dec. 10, 2015. Priority under 35 U.S.C. § 119(a) and 35 U.S.C. § 365(b) is claimed from Japanese Application No. 2014-253207 filed on Dec. 15, 2014, the disclosure of which is also incorporated herein by reference.

TECHNICAL FIELD

The present invention relates to an actinic radiation-curable inkjet ink, an inkjet image forming method, and a recording medium on which an image is formed by using the inkjet ink.

BACKGROUND ART

From the viewpoint of simple and inexpensive image production, an inkjet recording method has been used in a variety of printing fields. As the inkjet recording method, there is an actinic radiation-curable inkjet method in which droplets of actinic radiation-curable ink are attached on a recording medium and then the droplets of the ink attached on the recording medium is cured by irradiation with actinic radiation to form an image.

In relation to an inkjet ink to be used in the actinic radiation-curable inkjet method, there is known a technique of allowing an actinic radiation-curable inkjet ink to contain a gelling agent in order to prevent the ink from being unnecessarily mixed together due to wet spread of the ink after the ink is attached on a recording medium and before the ink is cured. In this technique, the gelling agent enables sol-gel phase transition through a temperature change, and thus the ink undergoes gelation after being attached on a recording medium and before being irradiated with actinic radiation so that ink mixing (color mixing) can be prevented.

When a usual inkjet ink is used for recording on a recording medium high in optical transparency, such as one to be used in soft packaging, the recording medium is transparent, thus cannot achieve the same contrast as that in recording on a blank recording medium, cannot sometimes achieve brilliant color production, and has difficulty in providing visible representation.

Therefore, when an inkjet ink is used for recording on a recording medium high in optical transparency, a known technique of enhancing visibility is adopted in which an image is subjected to white top coating or primer coating with an white ink having masking ability.

Titanium oxide high in masking ability is known as a pigment to be used in the white ink. For example, in PTL 1, an actinic radiation-curable inkjet ink containing titanium oxide high in masking ability as a white ink pigment is used.

CITATION LIST

Patent Literature

PTL 1
Japanese Patent Application Laid-Open No. 2009-41015

SUMMARY OF INVENTION

Technical Problem

Titanium oxide, however, has a high masking ability to light in an UV region, and thus, when being used for a white pigment of an actinic radiation-curable inkjet ink as a white ink, may inhibit curability of the white ink by UV irradiation. Therefore, the white ink described in PTL 1 may not be completely cured or may require time for curing thereof. Such a tendency has been particularly remarkable in a white ink having particularly high pinning properties and containing a gelling agent including a $C_{12}$ to $C_{26}$ alkyl chain in a straight-chain moiety.

Therefore, there has been demanded for development of a technique of enhancing curability of an actinic radiation-curable inkjet ink containing titanium oxide and a gelling agent including a $C_{12}$ to $C_{26}$ alkyl chain in a straight-chain moiety.

Accordingly, an object of the present invention is to provide a white actinic radiation-curable inkjet ink having good curability, an image forming method using such an actinic radiation-curable inkjet ink, and a recording medium on which an image is formed by using such an actinic radiation-curable inkjet ink.

Solution to Problem

At least one of the above problems of the present invention is solved by the following.

[1] An actinic radiation-curable inkjet ink including a photocurable compound, a photoinitiator, a gelling agent and a white pigment, in which the white pigment contains titanium oxide, the gelling agent contains gelling agent A containing a $C_{12}$ to $C_{26}$ alkyl chain in a straight-chain moiety, and a content of the gelling agent A relative to a content of the titanium oxide is 5 mass % to 35 mass %.

[2] The actinic radiation-curable inkjet ink according to [1], in which the gelling agent A includes at least one compound of compounds represented by Formulas (G1) and (G2) below:

$$R^1\text{—CO—}R^2 \qquad \text{Formula (G1):}$$

$$R^3\text{—COO—}R^4 \qquad \text{Formula (G2):}$$

in which $R^1$ to $R^4$ each independently represent an alkyl group containing a $C_{12}$ to $C_{26}$ straight-chain moiety and optionally further including a branched moiety.

[3] The actinic radiation-curable inkjet ink according to [1] or [2], in which the photocurable compound contains photocurable compound A which is (meth)acrylate satisfying a molecular weight of 280 to 1,500 and a C log P value of 4.0 to 7.0, in an amount of 10 mass % to 40 mass % relative to a total mass of the ink.

[4] The actinic radiation-curable inkjet ink according to any one of [1] to [3], further including a pigment dispersant, in which the pigment dispersant contains a comb-shaped block copolymer having tertiary amine.

[5] An inkjet image forming method including attaching the actinic radiation-curable inkjet ink according to any one of [1] to [4] as a white ink onto a recording medium through discharge from a recording head for ink discharge; and irradiating the attached actinic radiation-curable inkjet ink with actinic radiation.

[6] The inkjet image forming method according to [5], further including attaching a color ink developing a color other than white onto a recording medium.

[7] The inkjet image forming method according to [6], in which the color ink is an actinic radiation-curable inkjet ink comprising a photocurable compound, a photoinitiator and a colorant, the method comprising: attaching a first ink which is one of the white ink and the color ink onto a region of a recording medium on which an image is to be formed, through discharge from a recording head for ink discharge; further attaching a second ink which is the other of the white ink and the color ink onto a region of the recording medium onto which the first ink is attached, through discharge from a recording head for ink discharge, while the first ink attached onto the recording medium is not cured; and irradiating a region of the recording medium onto which the first ink and the second ink are attached, with actinic radiation.

[8] The inkjet image forming method according to [7], in which the white ink is attached onto a region of a recording medium on which an image is to be formed, through discharge from a recording head for ink discharge, and the color ink is further attached on a region of the recording medium onto which the white ink is attached, through discharge from a recording head for ink discharge.

[9] The inkjet image forming method according to [7], in which the color ink is attached onto a region of a recording medium on which an image is to be formed, through discharge from a recording head for ink discharge, and the white ink is further attached onto a region of the recording medium onto which the color ink is attached, through discharge from a nozzle of a recording head for ink discharge.

[10] A recording medium, in which an image is formed by using the actinic radiation-curable inkjet ink according to any one of [1] to [4].

Advantageous Effects of Invention

The present invention can provide a white actinic radiation-curable inkjet ink having good curability, and an inkjet image forming method.

DESCRIPTION OF EMBODIMENTS

Figure 1A:
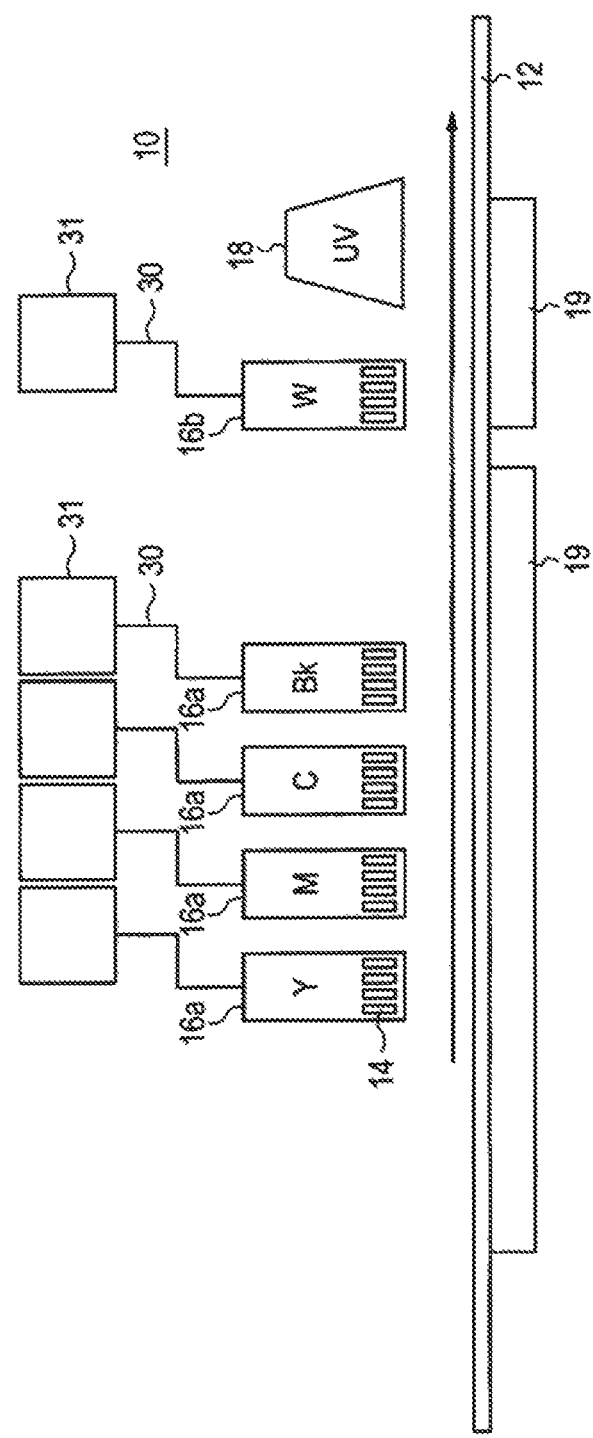
FIG. 1A is a side view illustrating one example of the configuration of the main part of an inkjet recording apparatus of line recording type which can be used for formation of an image according to one aspect of the present invention.

The present inventor has made intensive studies, and has thus found that, if smoothness of the surface of a white ink attached on a recording medium is lower, the light transmittance of actinic radiation is lower, and, if the light transmittance of actinic radiation to a white ink is lower, curability of a white ink is also lower. In addition, it has also been found that smoothness of the surface of a white ink containing gelling agent A including a $C_{12}$ to $C_{26}$ alkyl chain in a straight-chain moiety is lower and curability of the white ink is lower.

In other words, in attachment of the white ink on a recording medium, when smoothness of the ink surface is low and irregularity of the ink surface is high, scattering of actinic radiation on the ink surface is remarkable to result in deterioration in the light transmittance of actinic radiation to the white ink. It is thus presumed that actinic radiation in a sufficient dose for curing of the white ink does not reach the inside of the white ink and curability of the white ink is reduced.

The present inventor particularly has made additional studies about the cause for low smoothness of the surface of a white ink containing a gelling agent, and has thus presumed that a white ink containing gelling agent A including a $C_{12}$ to $C_{26}$ alkyl chain in a straight-chain moiety is easily increased in crystal size of the gelling agent therein as compared with other ink. Titanium oxide has a higher polarity than a pigment to be used for other color and is less likely to interact with a gelling agent having high lipophilicity (low polarity), and thus crystal growth of the gelling agent is less likely to be prevented by a pigment in an ink containing titanium oxide and the crystal size of the gelling agent is easily increased. When such large crystals of the gelling agent are present in the vicinity of the ink surface, the crystals of the gelling agent may cause the change in shape of the ink surface to result in deterioration in smoothness of the ink surface.

On the contrary, the present inventor has found that the content of gelling agent A including a $C_{12}$ to $C_{26}$ alkyl chain in a straight-chain moiety relative to the content of titanium oxide can be 5 mass % or more and 35 mass % or less, thus preventing color mixing by gelation of an ink attached and also decreasing irregularity of the surface of a white ink, and therefore making the surface of the white ink smoother.

When the content of gelling agent A relative to the content of titanium oxide is 35% or more (when the amount of the gelling agent is larger than the amount of titanium oxide), crystal growth of the gelling agent in the white ink is less likely to be prevented, and thus crystals of the gelling agent are presumed to be increased in size to result in an increase in surface irregularity. Herein, when the content of gelling agent A relative to the content of titanium oxide is less than 5% (when the amount of the gelling agent is smaller than the amount of titanium oxide), titanium oxide dispersed is enhanced in the action of aggregation, thus causing crystal growth of the gelling agent to be prevented to result in insufficient gelation of the ink. If gelation of the ink is insufficient, ink droplets attached on a recording medium are highly wet-spread, to easily cause color mixing.

For example, in the white ink described in PTL 1, the amount of the gelling agent is larger than the amount of titanium oxide, thus the amount of the gelling agent is excessive relative to the amount of titanium oxide and crystal growth of the gelling agent is promoted to enable no white ink having good smoothness to be obtained.

The actinic radiation-curable inkjet ink of the present invention (hereinafter, also referred to as "$TiO_2$ gel ink") is an actinic radiation-curable inkjet ink containing at least a photocurable compound, a photoinitiator, a gelling agent and a white pigment, in which the white pigment contains at least titanium oxide, the gelling agent contains at least one gelling agent A including a $C_{12}$ to $C_{26}$ alkyl chain in a straight-chain moiety, and the content of gelling agent A relative to the content of the titanium oxide is 5 mass % to 35 mass %.

Hereinafter, the present invention and components thereof, as well as embodiments and aspects for carrying out the present invention are described in detail. In the present invention, the term "to" described with respect to the numerical range is meant to encompass the numerical values described before and after the term as the lower limit and the upper limit, respectively.

[$TiO_2$ Gel Ink]

The $TiO_2$ gel ink is an ink composition curable by actinic radiation. The term "actinic radiation" refers to rays which can provide energy for generating an initiation seed in the ink composition by irradiation therewith, and encompasses α-rays, γ-rays, X-rays, ultraviolet rays, electron beams, etc. In particular, ultraviolet rays and electron beams are preferable and ultraviolet rays are more preferable from the viewpoint of more enhancing curing sensitivity and more enhancing availability of an irradiation apparatus.

Hereinafter, respective components, etc., forming the $TiO_2$ gel ink are described in detail.

[Gelling Agent]

The $TiO_2$ gel ink contains a gelling agent. In the present invention, the gelling agent is defined as "an organic substance which is solid at room temperature and liquefies when being heated, and also a compound which has a function of allowing the ink to undergo temperature-induced reversible sol-gel phase transition".

The $TiO_2$ gel ink contains, as the gelling agent, gelling agent A including a $C_{12}$ to $C_{26}$ straight alkyl group. When the content of gelling agent A relative to the content of titanium oxide is 5 mass % or more and 35 mass % or less in the ink containing a gelling agent including a $C_{12}$ to $C_{26}$ straight alkyl group, crystals of the gelling agent may be less likely to be increased in size in an ink containing titanium oxide and glossiness of an image may be higher. The gelling agent may have a branched chain in its structure.

The $TiO_2$ gel ink contains gelling agent A in a content of 5 mass % to 35 mass % relative to the content of titanium oxide. When the content of gelling agent A relative to the content of titanium oxide is 5 mass % to 35 mass %, the gelling agent appropriately interacts with titanium oxide to provide a white ink which undergoes gelation and also has low surface irregularity and good smoothness. If the content of gelling agent A relative to the content of titanium oxide is less than 5 mass %, the content of the gelling agent is so low that gelation of the ink is insufficient. If the content of gelling agent A relative to the content of titanium oxide is more than 35 mass %, the content of the gelling agent is excessively high relative to the content of titanium oxide to excessively cause crystal growth of the gelling agent, to enable no white ink having low surface irregularity and good smoothness to be obtained.

When the gelling agent is crystallized in the ink, it is preferable that a space three-dimensionally surrounded by crystals, a crystallized product of the gelling agent, is formed so that the photocurable compound is included in the space. Such a structure in which a photocurable compound is included in a space three-dimensionally surrounded by crystals of a gelling agent can be referred to as a "card house structure". Once a card house structure is formed, a liquid photocurable compound can be maintained in the card house structure and pinning properties of ink droplets can be enhanced. Accordingly, color mixing of droplets can be more prevented. It is preferable that the photocurable compound and the gelling agent dissolved in the ink are compatible with each other to form the card house structure.

For stable discharge of droplets of the $TiO_2$ gel ink from an inkjet recording apparatus, it is preferable that the photocurable compound and the gelling agent are favorably compatible with each other in a sol-state ink (at a high temperature, for example, about 80° C.).

Examples of such a gelling agent include:

aliphatic ketone compounds; aliphatic ester compounds; petroleum waxes such as paraffin wax, microcrystalline wax, and petrolatum; plant-derived waxes such as candelilla wax, carnauba wax, rice wax, sumac wax, jojoba oil, solid jojoba wax, and jojoba ester; animal-derived waxes such as beeswax, lanolin, and spermaceti; mineral waxes such as montan wax and hydrogenated wax; hydrogenated castor oil or hydrogenated castor oil derivatives; modified waxes such as montan wax derivatives, paraffin wax derivatives, microcrystalline wax derivatives, or polyethylene wax derivatives; higher fatty acids such as behenic acid, arachidic acid, stearic acid, palmitic acid, myristic acid, lauric acid, oleic acid, and erucic acid; higher alcohols such as stearyl alcohol and behenyl alcohol; hydroxystearic acids such as 12-hydroxystearic acid; 12-hydroxystearic acid derivatives; fatty acid amides such as lauric acid amide, stearic acid amide, behenic acid amide, oleic acid amide, erucic acid amide, ricinoleic acid amide, and 12-hydroxystearic acid amide (e.g., NIKKA AMIDE series manufactured by Nippon Kasei Chemical Co., Ltd., ITOWAX series manufactured by Itoh Oil Chemicals Co., Ltd., and FATTY AMID series manufactured by Kao Corporation); N-substituted fatty acid amides such as N-stearyl stearic acid amide and N-oleyl palmitic acid amide; specialty fatty acid amides such as N,N'-ethylene bisstearylamide, N,N'-ethylene bis-12-hydroxystearylamide, and N,N'-xylylene bisstearylamide; higher amines such as dodecylamine, tetradecylamine, or octadecylamine; fatty acid ester compounds such as stearyl stearic acid, oleyl palmitic acid, glycerin fatty acid ester, sorbitan fatty acid ester, propylene glycol fatty acid ester, ethylene glycol fatty acid ester, and polyoxyethylene fatty acid ester (e.g., EMALLEX series manufactured by Nihon Emulsion Co., Ltd., RIKEMAL series manufactured by Riken Vitamin Co., Ltd., and POEM series manufactured by Riken Vitamin Co., Ltd.); sucrose fatty acid esters such as sucrose stearate and sucrose palmitate (e.g., RYOTO Sugar Ester series manufactured by Mitsubishi-Kagaku Foods Corporation); synthetic waxes such as polyethylene wax and α-olefin-malic anhydride copolymer wax (UNILIN series manufactured by Baker-Petrolite, etc.); dimeric acids; dimer diols (PRIPOR series manufactured by CRODA International Plc, etc.); fatty acid inulins such as inulin stearate; fatty acid dextrins such as dextrin palmitate and dextrin myristate (RHEOPEARL series manufactured by Chiba Flour Milling Co., Ltd., etc.); glyceryl behenate eicosadioate; polyglyceryl behenate eicosadioate (NOMCORT series manufactured by Nisshin Oillio Group, Ltd., etc.); amide compounds such as N-lauroyl-L-glutamic acid dibutylamide and N-2-ethylhexanoyl-L-glutamic acid dibutylamide (available from Ajinomoto Fine-Techno Co., Inc.); dibenzylidene sorbitols such as 1,3:2,4-bis-O-benzylidene-D-glucitol (Gel All D available from New Japan Chemical Co., Ltd.); and low molecular weight oil gelling agents described in Japanese Patent Application Laid-Open No. 2005-126507, Japanese Patent Application Laid-Open No. 2005-255821, and Japanese Patent Application Laid-Open No. 2010-111790.

Specific examples of the gelling agent including a $C_{12}$ to $C_{26}$ straight alkyl group include aliphatic ketone compounds, aliphatic ester compounds, higher fatty acids, higher alcohols, and fatty acid amides having a $C_{12}$ to $C_{26}$ straight alkyl group.

From the viewpoint of easily forming plate-like crystals of the gelling agent to be precipitated, and more enhancing smoothness of the surface of the $TiO_2$ gel ink attached on a recording medium, the gelling agent is preferably an aliphatic ketone compound or an aliphatic ester compound. In other words, a compound represented by Formula (G1) or (G2) is preferable.

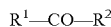 Formula (G1):

 Formula (G2):

In Formulas (G1) and (G2), $R^1$ to $R^4$ each independently represent an alkyl group including a $C_{12}$ to $C_{26}$ straight-chain moiety. $R^1$ to $R^4$ may include a branched moiety.

In Formula (G1), the alkyl group represented by each of $R^1$ and $R^2$ is not particularly limited, but is preferably an alkyl group including a $C_{12}$ to $C_{26}$ straight-chain moiety and having no branched chain.

Examples of the aliphatic ketone compound represented by Formula (G1) include dilignoceryl ketone (C24-C24), dibehenyl ketone (C22-C22), distearyl ketone (C18-C18), dieicosyl ketone (C20-C20), dipalmityl ketone (C16-C16), dimyristyl ketone (C14-C14), dilauryl ketone (C12-C12), lauryl myristyl ketone (C12-C14), lauryl palmityl ketone (C12-C16), myristyl palmityl ketone (C14-C16), myristyl stearyl ketone (C14-C18), myristyl behenyl ketone (C14-C22), palmityl stearyl ketone (C16-C18), palmityl behenyl ketone (C16-C22) and stearyl behenyl ketone (C18-C22).

Examples of commercially available products of the compound represented by Formula (G1) include 18-Pentatriacontanon (manufactured by Alfa Aeser, A Johnson Matthey Company), Hentriacontan-16-on (manufactured by Alfa Aeser, A Johnson Matthey Company) and KAO Wax T1 (manufactured by Kao Corporation). The aliphatic ketone compound contained in the $TiO_2$ gel ink may be used alone or as a mixture of two or more.

In Formula (G2), the alkyl group represented by each of $R^3$ and $R^4$ is not particularly limited, but is preferably an alkyl group including an alkyl group including a $C_{12}$ to $C_{26}$ straight-chain moiety and having no branched chain.

Examples of the aliphatic ester compound represented by Formula (G2) include behenyl behenate (C21-C22), icosyl icosanoate (C19-C20), stearyl stearate (C17-C18), palmityl stearate (C17-C16), lauryl stearate (C17-C12), cetyl palmitate (C15-C16), stearyl palmitate (C15-C18), myristyl myristate (C13-C14), cetyl myristate (C13-C16), octyl dodecyl myristate (C13-C20), stearyl oleate (C17-C18), stearyl erucate (C21-C18), stearyl linolate (C17-C18), behenyl oleate (C18-C22), myricyl cerotate (C25-C16), and arachidyl linolate (C17-C20).

Examples of commercially available products of the aliphatic ester compound represented by Formula (G2) include UNISTAR M-2222SL (manufactured by NOF Corporation), EXCEPARL SS (manufactured by Kao Corporation), EMALEX CC-18 (manufactured by Nihon Emulsion Co., Ltd.), AMREPS PC (manufactured by Kokyu Alcohol Kogyo Co., Ltd.), EXCEPARL MY-M (manufactured by Kao Corporation), SPERMACETI (manufactured by NOF Corporation), and EMALEX CC-10 (manufactured by Nihon Emulsion Co., Ltd.). These commercially available products are each often a mixture of two or more, and thus may be separated and purified, if necessary.

The gelling agent contained in the $TiO_2$ gel ink may be a mixture of two or more. The gelling agent mixture is preferably a gelling agent mixture selected from compounds shown in Table 1.

TABLE 1

| Class | Structure | Name | Manufacturer |
| --- | --- | --- | --- |
| Ketone wax | Distearyl ketone | KAO Wax T1 | Kao Corporation |
| | | 18-Pentatriacontanone | Reagent (Arfa Aeser) |
| | Dipalmityl ketone | Hentriacontan-16-on | Reagent (Arfa Aeser) |
| | Dilauryl ketone | 12-tricosanone | Reagent (Arfa Aeser) |
| Fatty acid ester | Stearyl stearate | EXCEPARL SS | Kao Corporation |
| | | UNISTAR M-9676 | NOF Corporation |
| | | EMALEX CC-18 | Nihon Emulsion Co., Ltd. |
| | | AMREPS SS | Kokyu Alcohol Kogyo Co., Ltd. |
| | Cetyl palmitate | AMREPS PC | Kokyu Alcohol Kogyo Co., Ltd. |
| | Behenyl behenate | UNISTAR M-2222SL | NOF Corporation |

The content of the gelling agent in the $TiO_2$ gel ink is preferably 0.5 to 10 mass %, even more preferably 2 to 5 mass %.

When two or more gelling agents are used in combination, the adding ratio thereof, namely, the ratio of each of the gelling agents to the total gelling agents is preferably adjusted so as to be 5 mass % or more and less than 95 mass %, more preferably 20 mass % or more and less than 80 mass %.

[Photocurable Compound]

The $TiO_2$ gel ink contains a photocurable compound. The photocurable compound refers to a compound which undergoes crosslinking or polymerization by irradiation with actinic radiation. The photocurable compound can be a radical polymerizable compound or a cationic polymerizable compound, and is preferably a radical polymerizable compound. The radical polymerizable compound is a compound (monomer, oligomer, polymer or mixture of these) which has a radical polymerizable ethylenically unsaturated bond. In the $TiO_2$ gel ink, either single or two or more types of the radical polymerizable compound may be contained.

Examples of the compound having an ethylenically unsaturated bond, which is radically polymerizable, include an unsaturated carboxylic acid and a salt thereof, an unsaturated carboxylic ester compound, an unsaturated carboxylic urethane compound, an unsaturated carboxylic amide compound and an anhydride thereof, acrylonitrile, styrene, unsaturated polyester, unsaturated polyether, unsaturated polyamide, and unsaturated urethane. Examples of the unsaturated carboxylic acid include (meth)acrylic acid, itaconic acid, crotonic acid, isocrotonic acid, and maleic acid.

In the present specification, "(meth)acrylic acid" encompasses acrylic acid and methacrylic acid, and "(meth)acrylate" encompasses an acrylate monomer and an acrylate oligomer, as well as a methacrylate monomer and a methacrylate oligomer.

Among the foregoing, the radical polymerizable compound is preferably an unsaturated carboxylic ester compound and more preferably (meth)acrylate. The (meth)acrylate may, in addition to a monomer described later, be an oligomer, a mixture of a monomer and an oligomer, a modified product, or an oligomer having a polymerizable functional group.

Examples of the (meth)acrylate include monofunctional monomers such as isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 2-(meth)acryloyloxy ethyl hexahydrophthalate, butoxyethyl (meth)acrylate, ethoxy diethylene glycol (meth)acrylate, methoxy diethylene glycol (meth)acrylate, methoxy polyethylene glycol (meth)acrylate, methoxy propylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxy ethyl succinate, 2-(meth)acryloyloxy ethyl phthalate, 2-(meth)acryloyloxyethyl-2-hydroxyethyl-phthalate, and t-butylcyclohexyl (meth)acrylate;

bifunctional monomers such as triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, di(meth)acrylate of a PO adduct of bisphenol A, hydroxy pivalic acid neopentyl glycol di(meth)acrylate, polytetramethylene glycol di(meth)acrylate, polyethylene glycol diacrylate, and tripropylene glycol diacrylate; and trifunctional or higher functional monomers such as trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, and pentaerythritol ethoxy tetra(meth)acrylate.

The (meth)acrylate is preferably stearyl (meth)acrylate, lauryl (meth)acrylate, isostearyl (meth)acrylate, ethoxy diethylene glycol (meth)acrylate, isobornyl (meth)acrylate, tetraethylene glycol di(meth)acrylate, glycerin propoxy tri(meth)acrylate, or the like from the viewpoint of photosensitivity, etc.

Preferably, the (meth)acrylate is in part ethylene oxide modified (meth)acrylate or propylene oxide modified (meth)acrylate. The ethylene oxide modified (meth)acrylate and the propylene oxide modified (meth)acrylate have high photosensitivity, and easily form a card house structure during gelling of the ink at a low temperature. In addition, since the ethylene oxide modified (meth)acrylate and the propylene oxide modified (meth)acrylate are soluble in other ink components at a high temperature and low shrink at curing, the printed matter is less likely to be curled during image formation.

Examples of the ethylene oxide modified (meth)acrylate include 4EO modified hexanediol diacrylate CD561 (molecular weight: 358), 3EO modified trimethylolpropane triacrylate SR454 (molecular weight: 429), 6EO modified trimethylolpropane triacrylate SR499 (molecular weight: 560), and 4EO modified pentaerythritol tetraacrylate SR494 (molecular weight: 528) all manufactured by Sartomer Company; polyethylene glycol diacrylate NK ester A-400 (molecular weight: 508), polyethylene glycol diacrylate NK ester A-600 (molecular weight: 742), polyethylene glycol dimethacrylate NK ester 9G (molecular weight: 536), and polyethylene glycol dimethacrylate NK ester 14G (molecular weight: 770) all manufactured by Shin-Nakamura Chemical Co., Ltd.; tetraethylene glycol diacrylate V#335HP (molecular weight: 302) manufactured by OSAKA ORGANIC CHEMICAL INDUSTRY LTD.; 3PO modified trimethylolpropane triacrylate Photomer 4072 (molecular weight: 471) manufactured by Cognis; and 1,10-decanediol dimethacrylate NK ester DOD-N (molecular weight: 310), tricyclodecanedimethanol diacrylate NK ester A-DCP (molecular weight: 304), and tricyclodecanedimethanol dimethacrylate NK ester DCP (molecular weight: 332) all manufactured by Shin-Nakamura Chemical Co., Ltd.

The (meth)acrylate may be other modified product, for example, caprolactone modified (meth)acrylate such as caprolactone modified trimethylolpropane tri(meth)acrylate; and caprolactam modified (meth)acrylate such as caprolactam modified dipentaerythritol hexa(meth)acrylate.

The (meth)acrylate may be a polymerizable oligomer. Examples of a polymerizable oligomer include epoxy (meth)acrylate oligomers, aliphatic urethane (meth)acrylate oligomers, aromatic urethane (meth)acrylate oligomers, polyester (meth)acrylate oligomers, and straight-chain (meth)acrylic oligomers.

Examples of the cationic polymerizable compound include epoxy compounds, vinyl ether compounds, and oxetane compounds. In the actinic radiation-curable inkjet ink according to one aspect of the present invention, either single or two or more types of the cationic polymerizable compound may be contained.

The epoxy compound is aromatic epoxide, alicyclic epoxide, and aliphatic epoxide. Aromatic epoxide and alicyclic epoxide are preferable in view of enhancing curability.

The aromatic epoxide can be di- or polyglycidyl ether, which is obtained by reacting polyhydric phenol or an alkylene oxide adduct thereof with epichlorohydrin. Examples of the polyhydric phenol or the alkylene oxide adduct thereof to be reacted include bisphenol A and alkylene oxide adducts thereof. The alkylene oxide in the alkylene oxide adduct can be ethylene oxide, and propylene oxide.

The alicyclic epoxide can be a cycloalkane oxide-containing compound, which is obtained by epoxidizing a cycloalkane-containing compound with an oxidizing agent such as hydrogen peroxide or peracid. The cycloalkane in the cycloalkane oxide-containing compound can be cyclohexene or cyclopentene.

The aliphatic epoxide can be di- or polyglycidyl ether, which is obtained by reacting an aliphatic polyhydric alcohol or an alkylene oxide adduct thereof with epichlorohydrin. Examples of the aliphatic polyhydric alcohol include alkylene glycols such as ethylene glycol, propylene glycol, and 1,6-hexanediol. The alkylene oxide in the alkylene oxide adduct can be ethylene oxide and propylene oxide.

Examples of the vinyl ether compound include monovinyl ether compounds such as ethylvinyl ether, n-butylvinyl ether, isobutylvinyl ether, octadecylvinyl ether, cyclohexylvinyl ether, hydroxybutylvinyl ether, 2-ethylhexylvinyl ether, cyclohexane dimethanol monovinyl ether, n-propylvinyl ether, isopropylvinyl ether, isopropenyl ether-o-propylene carbonate, dodecylvinyl ether, diethylene glycol monovinyl ether, and octadecylvinyl ether; and di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, and trimethylolpropane trivinyl ether. Of these vinyl ether compounds, di- or trivinyl ether compounds are preferable in light of curability and adhesion.

The oxetane compound refers to a compound having an oxetane ring. Examples thereof include oxetane compounds described in Japanese Patent Application Laid-Open Nos. 2001-220526, 2001-310937, and 2005-255821. Specific examples thereof include a compound represented by Formula (1) described in the paragraph [0089] of Japanese Patent Application Laid-Open No. 2005-255821, a compound represented by Formula (2) described in the paragraph [0092] thereof, a compound represented by Formula (7) described in the paragraph [0107] thereof, a compound represented by Formula (8) described in the paragraph [0109] thereof, and a compound represented by Formula (9) described in the paragraph [0116] thereof. Formulas (1), (2), (7), (8), and (9) described in Japanese Patent Application Laid-Open No. 2005-255821 are shown below

[Formula 1]

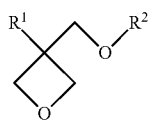

General formula (1)

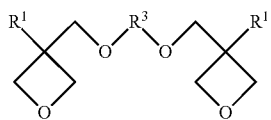

General formula (2)

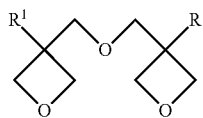

General formula (7)

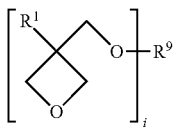

General formula (8)

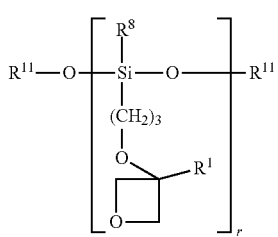

General formula (9)

The content of the photocurable compound in the $TiO_2$ gel ink is preferably 1 to 97 mass %, more preferably 30 to 95 mass %.

(Photocurable Compound A)

The $TiO_2$ gel ink preferably contains at least one (meth)acrylate (hereinafter, also referred to as "photocurable compound A") below, as the photocurable compound. Photocurable compound A preferably has two or more photocurable groups. When photocurable compound A has two or more photocurable groups, at least one photocurable group is a (meth)acryloyl group.

The photocurable compound A is easily compatible with gelling agent A. Accordingly, it is believed that photocurable compound A can decrease the rate of crystal growth of gelling agent A to more enhance smoothness of the surface of the $TiO_2$ gel ink attached on a recording medium.

The molecular weight of photocurable compound A is in the range from 280 to 1,500. The molecular weight of photocurable compound A is more preferably in the range from 300 to 800.

The C log P value of photocurable compound A is in the range of 4.0 to 7.0. The C log P value of photocurable compound A is more preferably in the range of 4.5 to 6.0.

Herein, the "log P value" is a coefficient indicating the affinity of an organic compound with water and 1-octanol, and 1-octanol/water partition coefficient P is obtained with respect to a partition equilibrium achieved in dissolution of a trace of a compound as a solute into a two-liquid phase solvent of 1-octanol and water, corresponds to the ratio of equilibrium concentrations of the compound in the respective solvents, and is expressed as log P which is the logarithm to the base 10. That is, the "log P value" is a logarithmic value of the 1-octanol/water partition coefficient, and is known as an important parameter indicating the hydrophilicity and hydrophobicity of a molecule.

The "C log P value" corresponds to a log P value obtained by calculation. The C log P value can be calculated from a fragment method, an atomic approach method, or the like. More specifically, in order to calculate the C log P value, the fragment method described in a literature (C. Hansch and A. Leo, "Substituent Constants for Correlation Analysis in Chemistry and Biology" (John Wiley & Sons, New York, 1969)) may be used. The calculation of the C log P value by a fragment method can be performed by allowing a computer to execute commercially available software package 1 or 2 below.

Software package 1: MedChem Software (Release 3.54, August 1991, Medicinal Chemistry Project, Pomona College, Claremont, Calif.)

Software package 2: Chem Draw Ultra ver. 8.0. (April 2003, CambridgeSoft Corporation, USA)

The C log P value described in the present invention corresponds to the "C log P value" calculated using software package 2.

The content of photocurable compound A is not particularly limited, and is preferably in the range from 10 to 40 mass % relative to the total mass of the $TiO_2$ gel ink.

Among compounds in which the molecular weight and the C log P value are in the above ranges, photocurable compound A is preferably three or higher functional methacrylate or acrylate having 3 to 14 unit structures represented by (—C(CH$_3$)H—CH$_2$—O—) in its molecule, or two or higher functional methacrylate or acrylate having a cyclic structure in its molecule.

Examples of commercially available products of photocurable compound A include 3PO modified trimethylolpropane triacrylate Photomer 4072 (molecular weight: 471, C log P: 4.90) manufactured by Cognis, 1,10-decanediol dimethacrylate NK ester DOD-N (molecular weight: 310, C log P: 5.75), tricyclodecanedimethanol diacrylate NK ester A-DCP (molecular weight: 304, C log P: 4.69) and tricyclodecanedimethanol dimethacrylate NK ester DCP (molecular weight: 332, C log P: 5.12) all manufactured by Shin-Nakamura Chemical Co., Ltd., nonylphenol 8EO modified acrylate Miramer M166 (molecular weight: 626, C log P value: 6.42) manufactured by Miwon Specialty Chemical, and trimethylolpropane 3PO modified triacrylate Miramer M360 (molecular weight: 471, C log P value: 4.90) manufactured by Miwon Specialty Chemical.

[Photoinitiator]

The $TiO_2$ gel ink contains a photoinitiator.

The photoinitiator is a radical polymerization initiator when the photocurable compound is a radical polymerizable compound, and the photoinitiator is a photoacid generating agent when the photocurable compound is a cationic polymerizable compound. The radical polymerization initiator includes an intramolecular bond cleaving type and an intramolecular hydrogen withdrawing type.

Examples of the intramolecular bond cleaving type radical polymerization initiator include acetophenones such as diethoxy acetophenone, 2-hydroxy-2-methyl-1-phenylpropan-1-one, benzyl dimethyl ketal, 1-(4-isopropyl phenyl)-2-hydroxy-2-methylpropan-1-one, 4-(2-hydroxy ethoxy) phenyl-(2-hydroxy-2-propyl) ketone, 1-hydroxy cyclohexyl-phenyl ketone, 2-methyl-2-morpholino-(4-thio methylphenyl)propan-1-one, and 2-benzyl-2-dimethyl-amino-1-(4-morpholinophenyl)-butanone; benzoins such as benzoin, benzoin methyl ether and benzoin isopropyl ether; acyl phosphine oxides such as 2,4,6-trimethyl benzoin diphenyl phosphine oxide; benzil, and methylphenyl glyoxy ester.

Examples of the intramolecular hydrogen withdrawing type radical polymerization initiator include benzophenones such as benzophenone, o-benzoyl benzoic acid methyl-4-phenyl benzophenone, 4,4'-dichloro benzophenone, hydroxy benzophenone, 4-benzoyl-4'-methyl-diphenyl sulfide, acrylated benzophenone, 3,3',4,4'-tetra-(t-butyl peroxy carbonyl) benzophenone and 3,3'-dimethyl-4-methoxy benzophenone; thioxanthones such as 2-isopropyl thioxanthone, 2,4-dimethyl thioxanthone, 2,4-diethyl thioxanthone, and 2,4-dichloro thioxanthone; amino benzophenones such as Michler's ketone and 4,4'-diethylamino benzophenone; 10-butyl-2-chloro acridone, 2-ethyl anthraquinone, 9,10-phenanthrene quinone, and camphor quinone.

The content of the photoinitiator in the $TiO_2$ gel ink, which may vary depending on actinic radiation and the type of the photocurable compound, is preferably 0.01 mass % to 10 mass %.

Examples of the photoacid generating agent include compounds used for chemical amplification type photoresists or photo-cationic polymerization (refer to pages 187 to 192 of "Imaging Yo Yuki Zairyo (Organic Materials Used for Imaging Applications)" edited by The Japanese Research Association for Organic Electronics Materials published by Bunshin Publishing (1993)).

[White Pigment]

The $TiO_2$ gel ink contains titanium oxide as a white pigment.

Titanium oxide is generally used as a white pigment, and is classified to anatase type or rutile type depending on the crystalline form thereof. Rutile type is often used in a paint or ink because of having high refractivity in the visible region and having a higher masking rate.

The weight average particle size of titanium dioxide is preferably 50 nm or larger and 500 nm or smaller, and more preferably 100 nm or larger and 300 nm or smaller. Controlling the weight average particle size of titanium dioxide to 50 nm or larger provides an ink having sufficient masking ability. On the other hand, controlling the weight average particle size of titanium dioxide to 500 nm or smaller enables stable dispersion of titanium oxide, which enhances the storage properties and ejection stability of the ink.

The average particle size in the present invention means the secondary volume average particle size of a pigment. The volume average particle size can be measured with commercially available particle size measurement equipment based on, for example, a light scattering method, an electrophoresis method, or a laser Doppler method. Specific examples of such a particle size measurement apparatus can include a laser diffraction type particle size measurement apparatus SLAD 1100 manufactured by Shimadzu Corporation, a particle analyzer (HORIBA LA-920), and ZETA-SIZER 1000 manufactured by Malvern Instruments Ltd.

Examples of commercially available products of titanium oxide include CR-EL (ISHIHARA SANGYO KAISHA, LTD.), CR-50 (ISHIHARA SANGYO KAISHA, LTD.), CR-80 (ISHIHARA SANGYO KAISHA, LTD.), CR-90 (ISHIHARA SANGYO KAISHA, LTD.), R-780 (ISHIHARA SANGYO KAISHA, LTD.), R-930 (ISHIHARA SANGYO KAISHA, LTD.), TCR-52 (Sakai Chemical Industry Co., Ltd.), R-310 (Sakai Chemical Industry Co., Ltd.), R-32 (Sakai Chemical Industry Co., Ltd.), KR-310 (Titan Kogyo, Ltd.), KR-380 (Titan Kogyo, Ltd.), and KR-380N (Titan Kogyo, Ltd.).

The $TiO_2$ gel ink may contain a known white pigment other than titanium oxide. Examples of the known white pigment include inorganic white pigments, organic white pigments and white hollow polymer fine particles.

Further, the $TiO_2$ gel ink may contain a dye or a non-white pigment for adjustment of color tone.

The content of the white pigment in the $TiO_2$ gel ink can be 3 mass % to 20 mass %, and is preferably 10 mass % to 15 mass %. The content of titanium oxide contained in the white pigment is preferably 70 mass % to 100 mass %.

[Pigment Dispersant]

The $TiO_2$ gel ink may contain a pigment dispersant. The pigment dispersant contained in the ink can increase dispersibility of the pigment. The pigment dispersant more preferably contains a comb-shaped block copolymer having tertiary amine (hereinafter, also referred to as "the copolymer", simply.). In the present invention, the comb-shaped block copolymer refers to a copolymer in which a straight-chain polymer forms the main chain and a different polymer is graft-polymerized as a side chain onto each monomer unit constituting the main chain.

The copolymer has tertiary amine, and this configuration increases the electron density of the amine, which is a functional group having adsorbing properties to the pigment, to provide strong basicity, which enables strong adsorption to an acidic group on the surface of the pigment. Accordingly, the copolymer according to one aspect of the present invention is less likely to be detached from the pigment even at a temperature around 85° C., at which an inkjet ink is ejected. Moreover, use of a copolymer having tertiary amine in the main chain for the copolymer according to one aspect of the present invention allows the side chain to be compatible with the photocurable compound, which facilitates dispersion of the dispersant itself, and the dispersibility of the pigment on which the pigment dispersant is adsorbed can also be enhanced. Accordingly, the variation in titanium oxide concentration in the ink can be reduced to more uniformly precipitate crystals of the gelling agent, thus more enhancing smoothness of the surface of the $TiO_2$ gel ink attached on a recording medium, and therefore the light transmittance of actinic radiation to the $TiO_2$ gel ink can be improved to result in more improved glossiness.

A substituent of the amine is not particularly limited, but is preferably a $C_1$ or $C_2$ alkyl group or the like.

The type of the copolymer is not particularly limited as long as the pigment dispersant satisfies the above conditions. Preferred examples of such pigment dispersants include BYK-2164, BYK-168 and BYK N-22024 each manufactured by BYK-Chemie GmbH, BYK JET-9150 and BYK JET-9151 each manufactured by ALTANA AG EFKA 4310, EFKA 4320 and EFKA 4401 each manufactured by BASF SE, SOLSPERSE 39000 manufactured by Avecia Biotechnology, Inc., and AJISPER PB-821 manufactured by Ajinomoto Fine-Techno Co., Inc.

For a comb-shaped block copolymer having a secondary or primary amine group, a hydrogen atom(s) of the amine group may be substituted with another substituent to convert into a tertiary amine group by using a known method, thus producing the copolymer. For example, a secondary or primary amine group of a comb-shaped block copolymer can be reacted with an alcohol such as decyl alcohol in the presence of a reduction catalyst to convert into a tertiary amine group substituted with alkyl groups.

The pigment dispersant may contain, in addition to the copolymer, a pigment dispersant such as hydroxyl group-containing carboxylic acid esters, salts of long chain polyaminoamides and high molecular weight acid esters, salts of high molecular weight polycarboxylic acids, salts of long chain polyaminoamides and polar acid esters, high molecular weight unsaturated acid esters, high molecular weight copolymers, modified polyurethane, modified polyacrylate, anionic surfactants of polyether ester type, naphthalenesulfonic acid-formalin condensate salts, aromatic sulfonic acid-formalin condensate salts, polyoxyethylene alkyl phosphoric acid esters, polyoxyethylene nonyl phenyl ether, and stearylamine acetate. Examples of commercially available products of the pigment dispersant include Solsperse series of Avecia Biotechnology, Inc., and PB series of Ajinomoto Fine-Techno Co., Inc.

The content of the pigment dispersant in the $TiO_2$ gel ink is not limited, but is preferably 2.0 mass % to 8.0 mass %. The content of the pigment dispersant is more preferably 2.0 mass % to 5.0 mass %.

[Additional Components]

If necessary, the $TiO_2$ gel ink may further contain a dispersion promoter. The dispersion promoter can be selected according to the pigment. If necessary, the $TiO_2$ gel ink may further contain a dispersion medium for dispersing the pigment. The dispersion medium may be a solvent other than the photocurable compound, but the dispersion medium is preferably the photocurable compound in order to prevent the solvent from remaining in a formed image.

If necessary, the $TiO_2$ gel ink may further contain a photoinitiator auxiliary agent, a polymerization inhibitor, or the like. The photoinitiator auxiliary agent may be a tertiary amine compound and is preferably an aromatic tertiary amine compound. Examples of the aromatic tertiary amine compound include N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxyethylaniline, triethylamine and N,N-dimethyl hexylamine. Among them, N,N-dimethylamino-p-benzoic acid ethyl ester and N,N-dimethylamino-p-benzoic acid isoamyl ethyl ester are preferable. The actinic radiation-curable inkjet white ink according to one aspect of present invention may contain either single or two or more types of the photoinitiator auxiliary agent.

Examples of the polymerization inhibitor include (alkyl) phenol, hydroquinone, catechol, resorcin, p-methoxyphenol, t-butyl catechol, t-butyl hydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferrone, aluminum N-nitrosophenyl hydroxylamine, tri-p-nitrophenylmethyl, N-(3-oxyanilino-1,3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime.

The $TiO_2$ gel ink may further contain at least one of an UV absorber and an antioxidant to enhance the weather resistance of the cured product.

The longest absorption wavelength of the UV absorber is preferably 410 nm or shorter from the viewpoint of light resistance and ozone resistance. The absorption wavelength of the UV absorber can be determined by measuring the UV-visible absorption spectrum. The content of the UV absorber in the $TiO_2$ gel ink is preferably 2 mass % or less, more preferably 1 mass % or less, even more preferably 0.5 mass % or less. If the content of the UV absorber is 2 mass % or less, lowering of curability and coloring of the cured product due to the UV absorber can be less likely to occur. On the other hand, the content of the UV absorber in the $TiO_2$ gel ink is preferably 0.1 mass % or more to lower the photocatalytic action of an inorganic white pigment sufficiently through absorption of ultraviolet rays radiated.

The content of the antioxidant in the $TiO_2$ gel ink is preferably 0.8 mass % or less, and more preferably 0.5 mass % or less. If the content of the antioxidant is 0.8 mass % or less, lowering of curability due to the antioxidant can be prevented. On the other hand, the content of the antioxidant in the $TiO_2$ gel ink is preferably 0.05 mass % or more to sufficiently inhibit the oxidation of a resin, etc., through scavenging a radical generated in the cured film of the ink.

The total amount of the UV absorber and the antioxidant in the $TiO_2$ gel ink is preferably 2.0 mass % or less, and more preferably 1.0 mass % or less. If the total amount of the UV absorber and the antioxidant in the $TiO_2$ gel ink is 2.0 mass % or less, the viscosity of the ink is adjusted in a preferred range, and good ejection stability and curability are easily kept.

If necessary, the $TiO_2$ gel ink may further contain additional component(s). Additional components can be various additives and other resins. Examples of the additives include surfactants, leveling agents, matting agents, IR absorbers, antibacterial agents, and basic compounds that serve to increase the storage stability of ink. Examples of the basic compounds include basic alkali metal compounds, basic alkali earth metal compounds, and basic organic compounds such as amines.

Examples of other resins include resins for adjusting the physical properties of a cured film; examples thereof include polyester resins, polyurethane resins, vinyl resins, acrylic resins, and rubber resins.

[Preparation of $TiO_2$ Gel Ink]

The $TiO_2$ gel ink can be obtained by mixing the photocurable compound, photoinitiator, gelling agent and white pigment with arbitrary components under heating. The obtained mixed solution is preferably filtered through a predetermined filter. Here, a dispersion containing the pigment and the dispersant may be prepared in advance, and the other components may be added thereto and mixed under heating.

Dispersing of the pigment can be performed by using ball mill, sand mill, attritor, roll mill, agitator, HENSCHEL MIXER, colloid mill, ultrasound homogenizer, pearl mill, wet jet mill, or paint shaker, for example.

[Physical Properties of $TiO_2$ Gel Ink]

Because the $TiO_2$ gel ink contains the gelling agent, it can undergo a temperature-induced reversible sol-gel phase transition. Since a sol-gel phase transition type actinic radiation-curable ink is a sol at high temperatures (e.g., about 80° C.), the ink can be discharged from a recording head for ink discharge, and the ink attached on a recording medium undergoes gelation by natural cooling. Accordingly, combining of neighboring dots is prevented and thus image quality improves.

In order to enhance ability of ejection of the $TiO_2$ gel ink, the viscosity of the ink at a high temperature is preferably equal to or lower than a predetermined value. Specifically, the viscosity at 80° C. of the ink is preferably 3 to 20 mPa·s, more preferably 6.0 to 15.0 mPa·s, and even more preferably 7.0 to 12.0 mPa·s. In order to prevent combining of neighboring dots, the viscosity of the ink at room temperature after attaching has a certain value or more. Specifically, the viscosity at 25° C. of the $TiO_2$ gel ink is preferably 1,000 mPa·s or more.

The gelation temperature of the $TiO_2$ gel ink is preferably 40° C. or higher and 70° C. or lower, and more preferably 50° C. or higher and 65° C. or lower. In the case where the ejection temperature is near 80° C., if the gelation temperature of the ink is 70° C. or lower, reduction in ability of ejection due to gelation at the time of ejection can be less likely to occur. On the other hand, if the gelation temperature is 40° C. or higher, the ink can undergo gelation quickly after attached on a recording medium. The gelation temperature is a temperature when fluidity is lowered by gelation of the ink in a sol state in a process of cooling the sol-state ink.

The viscosity at 80° C., the viscosity at 25° C., and the gelation temperature of the $TiO_2$ gel ink can be found by measuring a change in dynamic viscoelasticity caused by a temperature variation of the ink using a rheometer. Specifically, when the ink is heated to 100° C. and cooled to 25° C. with conditions including shear rate of 11.7 (1/s) and temperature decrease rate of 0.1° C./s, a viscosity change curve according to temperature is obtained. Further, the viscosity at 80° C. and the viscosity at 25° C. can be obtained by reading each of viscosities at 80° C. and 25° C. in a temperature change curve of the viscosity. The gelation temperature can be obtained from a temperature at which the viscosity reaches 200 mPa·s in a viscosity change curve according to temperature.

As for the rheometer, stress control type rheometer Physica MCR series manufactured by Anton Paar can be used. The size of the corn plate can be 75 mm and the corn angle can be 1.0°.

[Ink Set Containing $TiO_2$ Gel Ink]

An ink set may be prepared by using the $TiO_2$ gel ink as a white ink and a color ink developing a color other than white, in combination. The color ink for an ink set is not particularly limited, and may be appropriately selected in accordance with an intended image. The color ink is preferably an ink dischargeable through inkjet as is the case with the $TiO_2$ gel ink from the viewpoint of easiness in formation of an image, and more preferably an actinic radiation-curable ink containing a photocurable compound, a photoinitiator and a colorant. The color ink may be an actinic radiation-curable ink containing a gelling agent and as a result being capable of undergoing sol-gel phase transition. The $TiO_2$ gel ink undergoes gelation after attached on a recording medium, and thus is less likely to be mixed with the color ink on the recording medium.

The photocurable compound, photoinitiator, gelling agent and additional component(s) which can be contained in the color ink can be the same as the photocurable compound, photoinitiator, gelling agent and additional component(s) which can be contained in the $TiO_2$ gel ink.

Examples of the colorant which can be contained in the color ink include known pigments and dyes. The colorant is preferably a pigment from the viewpoint of obtaining an image good in weather resistance. The pigment can be selected from, for example, a yellow pigment, a red or magenta pigment, a blue or cyan pigment, and a black pigment, depending on the color of an image to be formed, etc.

Physical properties of the color ink can be arbitrarily determined according to desired application methods. For example, in the case of an actinic radiation-curable ink containing the color ink and as a result being capable of undergoing sol-gel phase transition, physical properties of the color ink are preferably in the above ranges described above with respect to the $TiO_2$ gel ink.

In one aspect of an image forming method to be described later, the above ink set enables formation of a top coating part and a primer coating part of an image by attaching the $TiO_2$ gel ink before or after attachment of the color ink.

The color ink may be a black ink, a cyan ink, a magenta ink, or a yellow ink, or an ink having another color.

[Inkjet Image Forming Method]

The inkjet image forming method according to one aspect of the present invention includes (a) attaching the $TiO_2$ gel ink onto a recording medium through discharge from a recording head for ink discharge, and (b) irradiating the attached $TiO_2$ gel ink with actinic radiation.

To enhance ability of the ink discharge in (a) attaching the $TiO_2$ gel ink onto a recording medium through discharge from a recording head for ink discharge, the temperature of the $TiO_2$ gel ink inside the recording head for ink discharge is preferably set such that it is from 10 to 30° C. higher than the gel transition temperature of the ink. Controlling the temperature of the $TiO_2$ gel ink inside the recording head for ink discharge to (gelation temperature)+10° C. or higher can prevent the gelation of the ink inside the recording head for ink discharge or at the surface of the nozzle, and thus the ink droplets can be discharged stably. On the other hand, controlling the temperature of the $TiO_2$ gel ink inside the recording head for ink discharge to (gelation temperature)+30° C. or lower can prevent the deterioration of the ink components due to a high temperature of the ink. The $TiO_2$ gel ink can be heated in the recording head for ink discharge of the inkjet recording apparatus, in the ink channel connected to the recording head for ink discharge, or in the ink tank connected to the ink channel.

The amount of liquid per $TiO_2$ gel ink droplet to be discharged from each nozzle of the recording head for ink discharge may vary depending on, for example, the viscosity of the $TiO_2$ gel ink, and it is preferably 0.5 to 10 pl, and, for discharging only to a desired region, more preferably 0.5 to 4.0 pl, and even more preferably 1.5 to 4.0 pl. Even if the $TiO_2$ gel ink is attached in such an amount, the $TiO_2$ gel ink can be discharged only to a desired region without excessive wet spread because the ink undergoes sol-gel phase transition.

The droplets of the $TiO_2$ gel ink attached onto a recording medium are cooled and quickly undergo gelation by sol-gel phase transition. As a result, the droplets of the $TiO_2$ gel ink can be pinned without excessive wet spread. Moreover, since the droplets quickly undergo gelation, oxygen is less likely to be incorporated into the droplets and curing of the photocurable compound is less likely to be inhibited by oxygen.

The temperature of the recording medium at the time of attachment of the droplets of the $TiO_2$ gel ink is preferably set such that it is from 10 to 20° C. lower than the gelation temperature of the ink. When the temperature of the recording medium is excessively low, the droplets of the $TiO_2$ gel ink undergo gelation and pinning too fast. On the other hand, when the temperature of the recording medium is excessively high, it is difficult for the droplets of the $TiO_2$ gel ink to undergo gelation, and therefore neighboring dots of the ink droplets may be mixed with each other. By appropriately adjusting the temperature of the recording medium, it is possible to achieve both a moderate level of smoothness (leveling) that does not allow for mixing among neighboring dots of the ink droplets and appropriate pinning.

By irradiating the droplets of the $TiO_2$ gel ink attached onto a recording medium with actinic radiation in (b) irradiating the attached $TiO_2$ gel ink with actinic radiation, the photocurable compound contained in the $TiO_2$ gel ink undergoes crosslinking or polymerization to cure the ink droplets.

The actinic radiation to be directed on the $TiO_2$ gel ink droplets attached onto a recording medium can be ultraviolet rays from metal halide lamps, LED light source(s), or the like. Use of an LED, among these light sources, can prevent the $TiO_2$ gel ink droplets from being softened and being poorly cured at the surface of the cured film by radiation heat from the light source. Examples of the LED include 395 nm, Water Cooled LED manufactured by Phoseon Technology.

A light source is installed such that it provides UV ray of from 360 to 410 nm wavelength with peak illuminance from 0.5 to 10 $W/cm^2$ and preferably from 1 to 5 $W/cm^2$ on a surface of the image.

The recording medium can be either paper or a resin film. Examples of the paper include coated paper for printing and coated paper B for printing. Further, examples of the resin film include a polyethylene terephthalate film, a polypropylene film, and a vinyl chloride film.

The recording medium is preferably a recording medium having high transparency. The phrase "high transparency" means that the visible light transmittance is 70% or more. Examples of the recording medium having high transparency include a polyethylene terephthalate film, a polypropylene film, and a vinyl chloride film.

The conveyance speed of the recording medium is preferably 30 to 120 m/s. As the conveyance speed increases, the image forming speed also increases, and thus desirable. However, when the conveyance speed is excessively high, the image quality is deteriorated or photocuring of the $TiO_2$ gel ink becomes insufficient.

(Inkjet Image Forming Method to be Performed Using $TiO_2$ Gel Ink and Color Ink)

The inkjet image forming method according to one aspect of the present invention can be performed by using the $TiO_2$ gel ink and the color ink.

The color ink may be applied by a roll coater or the like, or may be attached as an inkjet ink onto a recording medium through discharge from a recording head for ink discharge.

The color ink may be attached onto a recording medium before the $TiO_2$ gel ink is attached onto a recording medium through discharge from a recording head for ink discharge, or may be attached onto a recording medium after the $TiO_2$ gel ink is attached onto a recording medium through discharge from a recording head for ink discharge. When the color ink is attached before the $TiO_2$ gel ink is attached, the $TiO_2$ gel ink can serve as a top coating part of an image. When the color ink is attached after the $TiO_2$ gel ink is attached, the $TiO_2$ gel ink can serve as a primer coating part of an image.

When the color ink is an actinic radiation-curable inkjet ink containing a photocurable compound, a photoinitiator and a colorant, one ink may be attached onto a recording medium and then the ink may be cured through irradiation with actinic radiation, and thereafter other ink may be attached onto the recording medium. Alternatively, with one ink being attached on a recording medium and the ink being not cured, other ink may be attached on the recording medium and irradiation with actinic radiation may be made such that both the inks are cured.

In the latter case, the inkjet image forming method according to one aspect of the present invention includes attaching at least one ink of the $TiO_2$ gel ink and the color ink onto a region of a recording medium on which an image is to be formed, further attaching the other ink of the $TiO_2$ gel ink and the color ink onto a region of the recording medium onto which the ink is attached, through discharge from a recording head for ink discharge, while the ink attached onto the recording medium is not cured; and irradiating a region of the recording medium onto which the $TiO_2$ gel ink and the color ink are attached, with actinic radiation.

Herein, the $TiO_2$ gel ink may be attached onto a region of a recording medium on which an image is to be formed, through discharge from a recording head for ink discharge, and then the color ink may be further attached on a region of the recording medium onto which the $TiO_2$ gel ink is attached, through discharge from a recording head for ink discharge. Alternatively, the color ink may be attached onto a region of a recording medium on which an image is to be formed, through discharge from a recording head for ink discharge, and then the $TiO_2$ gel ink may be further attached on a region of the recording medium onto which the color ink is attached, through discharge from a nozzle of a recording head for ink discharge. In particular, in the latter case, a conventional actinic radiation-curable inkjet ink containing titanium oxide has been sometimes low in curability of the ink. Use of the $TiO_2$ gel ink, however, can more enhance the curability of the ink.

In the case where the color ink is an inkjet ink, the temperature of the inkjet ink inside the recording head for ink discharge is preferably adjusted to about the same temperature as that at the time of discharge of the $TiO_2$ gel ink, and more preferably adjusted within ±10° C. of the temperature of the $TiO_2$ gel ink to enhance ability of the color ink droplet discharge.

The amount of liquid per color ink droplet to be discharged from each nozzle of the recording head for ink discharge may vary depending on the resolution of an image. It is preferably from 0.5 to 10 pl, and, for forming a high-resolution image, it is more preferably from 0.5 to 4.0 pl.

The total film thickness of the ink droplet after curing is preferably from 1 to 20 μm. The term "total film thickness of the ink droplet" refers to a maximum value of the film thickness of the cured film of the $TiO_2$ gel ink (and optionally the color ink) attached on a recording medium.

[Recording Medium with Image Formed]

The recording medium according to one aspect of the present invention is a recording medium onto which the $TiO_2$ gel ink is attached and cured. Attachment and curing of the $TiO_2$ gel ink can be detected by a known chemical analysis. The $TiO_2$ gel ink is preferably attached and cured by the inkjet image forming method according to one aspect of the present invention.

The recording medium according to one aspect of the present invention may be used for further attaching the color ink and forming an image. In addition, the $TiO_2$ gel ink is sufficiently cured on the recording medium according to one aspect of the present invention, and thus deterioration in white density due to friction or the like is less likely to occur. The $TiO_2$ gel ink and the color ink may be attached onto the recording medium according to one aspect of the present invention. When the $TiO_2$ gel ink and the color ink are attached onto the recording medium according to one aspect of the present invention, good visibility is imparted by top coating or primer coating with the $TiO_2$ gel ink.

[Inkjet Recording Apparatus]

In the case where attachment and fixation of the $TiO_2$ gel ink, and attachment and fixation of the actinic radiation-curable color ink are performed by using the above ink set in a single inkjet recording apparatus, an apparatus having any of configurations as illustrated in FIGS. 1A to 3 can be used. The inkjet recording apparatus of actinic radiation-curable inkjet type includes line recording type (single pass recording type) and serial recording type. Although any type may be selected depending on desired resolution or recording speed, the line recording (single pass recording type) is preferred from the viewpoint of high speed recording.

Figure 1B:
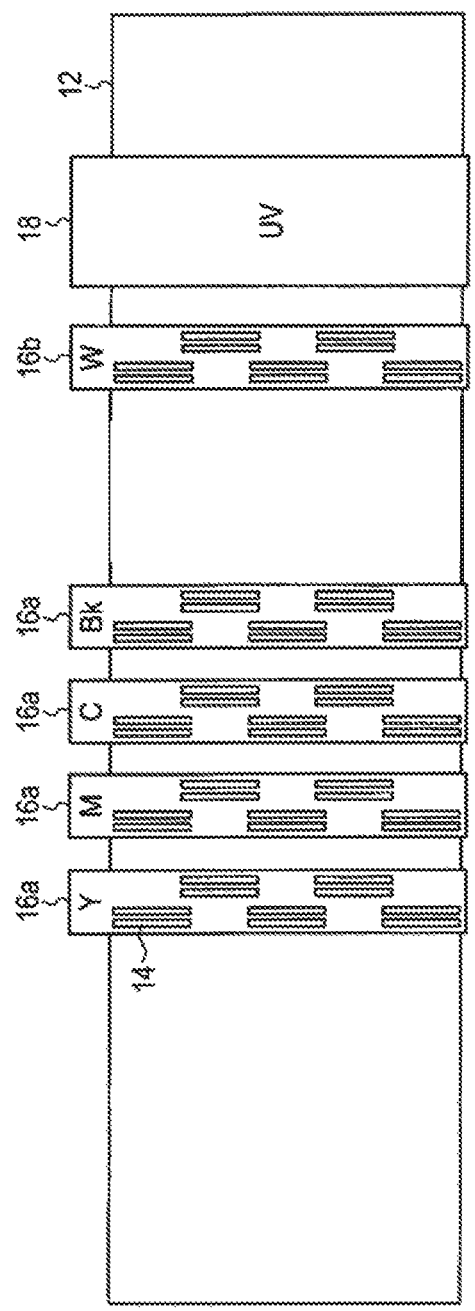
FIG. 1B is a top view illustrating one example of the configuration of the main part of an inkjet recording apparatus of line recording type which can be used for formation of an image according to one aspect of the present invention.
Figure 2A:
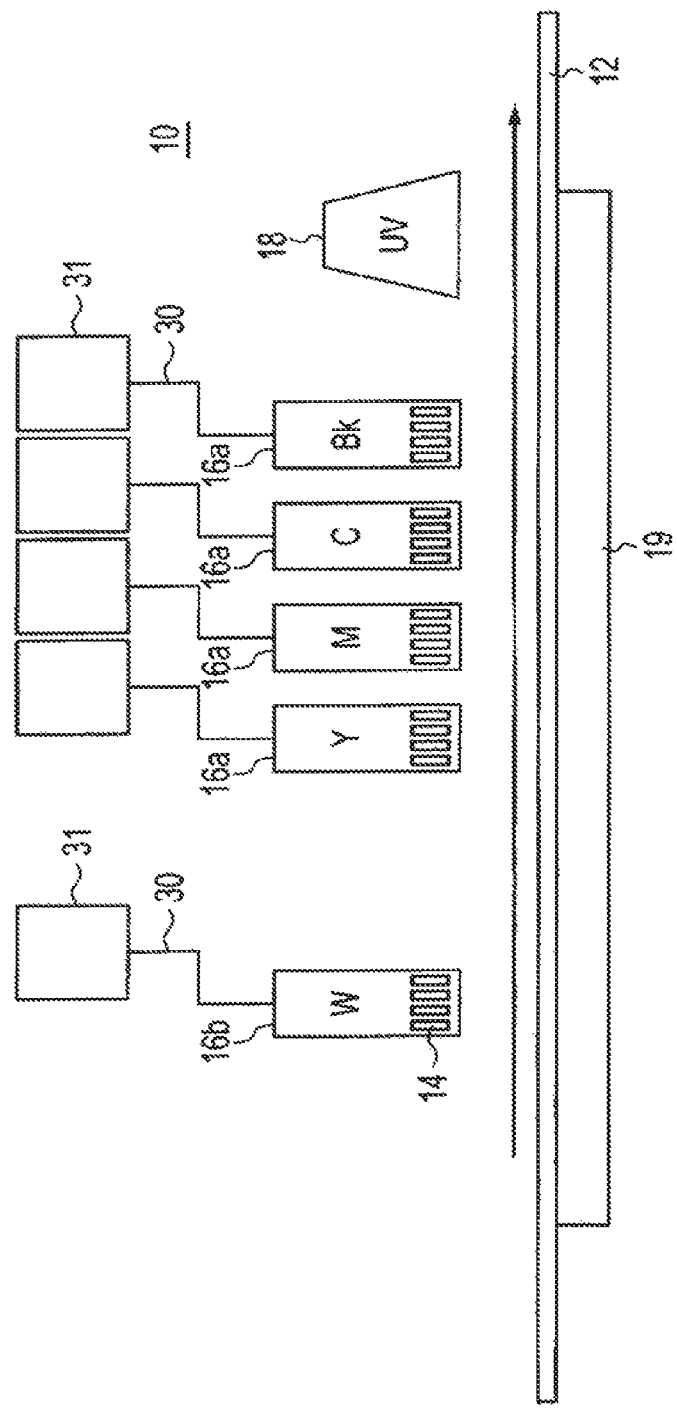
FIG. 2A is a side view illustrating another example of the configuration of the main part of an inkjet recording apparatus of line recording type which can be used for formation of an image according to another aspect of the present invention.
Figure 2B:
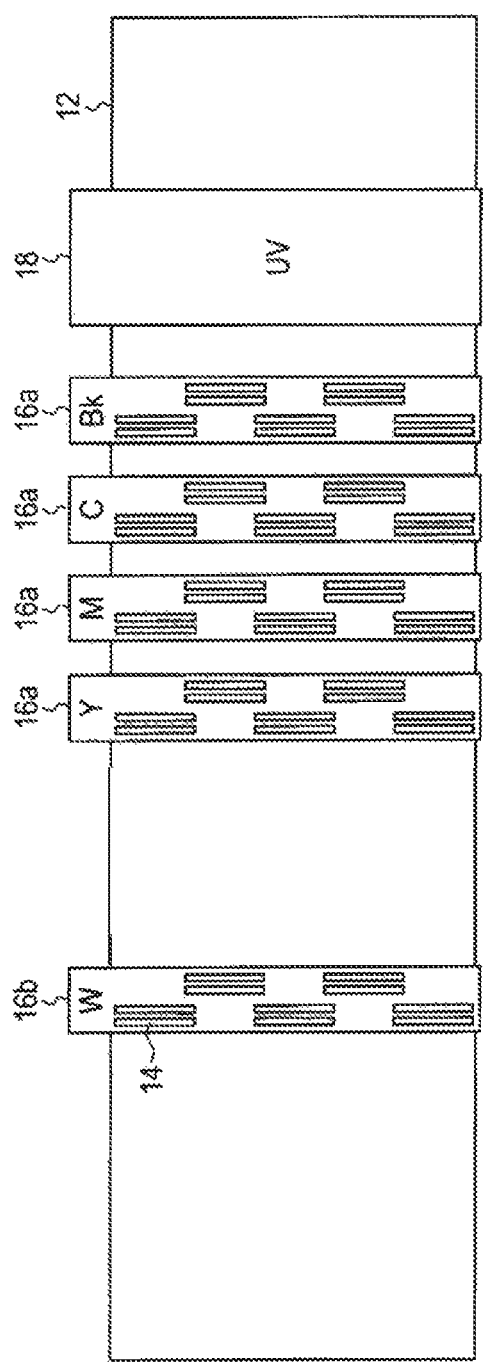
FIG. 2B is a top view illustrating another example of the configuration of the main part of an inkjet recording apparatus of line recording type which can be used for formation of an image according to another aspect of the present invention.

FIG. 1A is a side view illustrating an example of the configurations of the main part of an inkjet recording apparatus of line recording type, and FIG. 1B is a top view thereof. FIG. 2A is a side view illustrating another example of the configurations of the main part of an inkjet recording apparatus of line recording type, and FIG. 2B is a top view thereof.

As illustrated in FIGS. 1A, 1B, 2A, and 2B, inkjet recording apparatus 10 has head carriage 16 (16a and 16b) for accommodating a plurality of recording heads for ink discharge 14, ink channel 30 connected to head carriage 16, ink tank 31 for storing the ink to be fed via ink channel 30, and light irradiation section 18 which covers the entire width of recording medium 12 and which is arranged at a downstream side of head carriage 16 (conveyance direction of the recording medium), and temperature control section 19 installed on a backside of recording medium 12.

Head carriage 16 in inkjet recording apparatus 10 includes head carriage 16a for the color ink and head carriage 16b for the $TiO_2$ gel ink. Head carriage 16a for the color ink includes head carriages for different colors. As illustrated in, for example, FIG. 1B, head carriages 16a and 16b are fixedly arranged so as to cover the entire width of recording medium 12 and accommodates a plurality of recording heads for ink discharge 14. Recording head for ink discharge 14 is designed to receive the color ink or $TiO_2$ gel ink from ink tank 31.

A plurality of recording heads for ink discharge 14 is installed for each color in the conveyance direction of recording medium 12. The number of recording heads for ink discharge 14 that are arranged in the conveyance direction of recording medium 12 is determined based on the nozzle density of recording head for ink discharge 14 and the resolution of a printed image. For example, when an image having the resolution of 1,440×1,440 dpi is formed by using recording head for ink discharge 14 with a drop volume of 2 pl and a nozzle density of 360 dpi, four of recording head for ink discharge 14 can be arranged in a staggered manner relative to the conveyance direction of recording medium 12. Further, when an image having the resolution of 720× 720 dpi is formed by using recording head for ink discharge 14 with a drop volume of 6 pl and a nozzle density of 360 dpi, two of recording head for ink discharge 14 can be arranged in a staggered manner. As described herein, dpi represents the number of ink droplets (dots) per 2.54 cm.

Ink tank 31 is connected to head carriage 16 via ink channel 30. Ink channel 30 is a passage for supplying an ink in ink tank 31 to head carriage 16. For stable discharge of ink droplets, the ink present in ink tank 31, ink channel 30, head carriage 16, and recording head for ink discharge 14 is heated to a predetermined temperature to maintain the gel state.

Light irradiation sections 18 cover the entire width of recording medium 12 and they are arranged at a downstream side of head carriage 16 relative to the conveyance direction of the recording medium. Light irradiation sections 18 irradiate, with light, the ink droplets which have been discharged from recording head for ink discharge 14 and attached onto recording medium 12 so as to cure the ink droplets.

Temperature control section 19 is installed on a backside of recording medium 12 and it maintains recording medium 12 at a predetermined temperature. As illustrated for example in FIG. 1A, temperature control section 19 may be divided to portions on head carriage 16a side for the color ink and on head carriage 16b side for the $TiO_2$ gel ink. Temperature control section 19 can be various heaters, for example.

Hereinafter, image forming method using inkjet recording apparatus 10 of a line recording type is described. In the recording apparatuses of FIGS. 1A and 1B, recording medium 12 is conveyed to a region between head carriage 16a for the color ink of inkjet recording apparatus 10 and temperature control section 19. Meanwhile, recording medium 12 is adjusted to a predetermined temperature by temperature control section 19. Subsequently, the ink droplets at a high temperature are discharged from recording head for ink discharge 14 of head carriage 16a for the color ink and attached to (landed on) recording medium 12.

Further, the ink droplets at a high temperature are discharged from recording head for ink discharge 14 of head carriage 16b for the $TiO_2$ gel ink and attached onto recording medium 12. The ink droplets of the $TiO_2$ gel ink attached onto recording medium 12 are cured by light irradiation using light irradiation section 18.

In the recording apparatuses of FIGS. 2A and 2B, recording medium 12 is conveyed to a region between head carriage 16b for the $TiO_2$ gel ink of inkjet recording apparatus 10 and temperature control section 19. On the other hand, recording medium 12 is adjusted to a predetermined temperature by temperature control section 19. Subsequently, the ink droplets at a high temperature are discharged from recording head for ink discharge 14 of head carriage 16b for the $TiO_2$ gel ink and attached onto recording medium 12.

Further, the ink droplets at a high temperature are discharged from recording head for ink discharge 14 of head carriage 16a for the color ink and attached onto recording medium 12. Then, the color ink droplets attached onto recording medium 12 are cured by light irradiation using light irradiation section 18.

Figure 3:
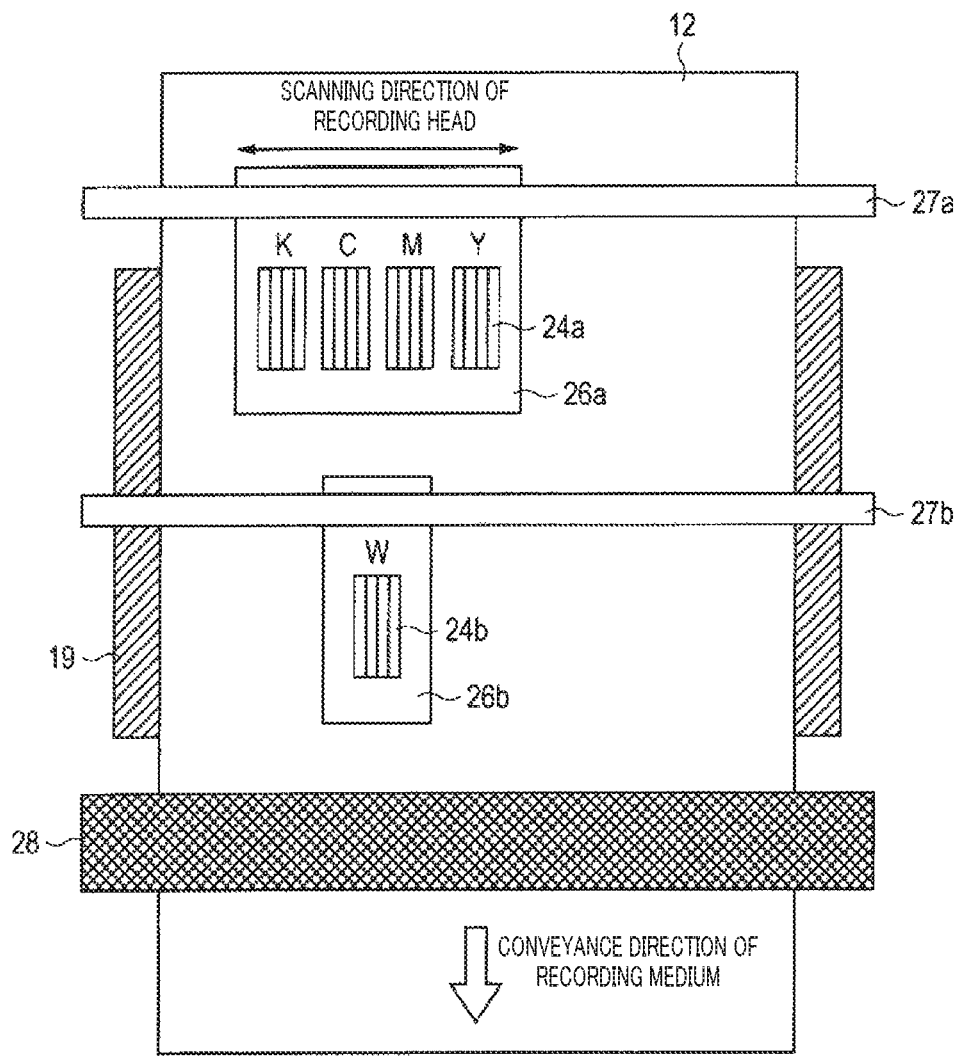
FIG. 3 is a top view illustrating one example of the configuration of the main part of an inkjet recording apparatus of serial recording type which can be used for formation of an image according to yet another aspect of the present invention.

FIG. 3 is a diagram illustrating an example of the configuration of the main part of inkjet recording apparatus 20 of a serial recording type. As illustrated in FIG. 3, inkjet recording apparatus 20 can be configured in the same manner as that depicted in FIGS. 1A and 1B except that it has head carriages 26a and 26b each of which has a width narrower than the entire width of the recording medium and accommodates a plurality of recording heads for ink discharge 24a and 24b instead of head carriages 16a and 16b each of which is fixedly arranged so as to cover the entire width of recording medium, and guide sections 27a and 27b for operating head carriage 26 in the width direction of recording medium 12.

In inkjet recording apparatus 20 of serial recording type, head carriage 26 discharges the ink droplets from recording head for ink discharge 24 accommodated in head carriage 26 while moving along guide section 27 in the width direction of recording medium 12. Once head carriage 26 moves completely in the width direction of recording medium 12 (for each pass), recording medium 12 is delivered in the conveyance direction. Except those operations, the image is recorded in almost the same manner as inkjet recording apparatus 10 of a line recording type that is described above.

In inkjet recording apparatus 20 having the configuration illustrated in FIG. 3, the droplets of the color ink and the $TiO_2$ gel ink are exposed to light at once by light irradiation section 28. Although head carriage 26a for attaching the color ink is disposed in the upstream, head carriage 26b for attaching the $TiO_2$ gel ink may be disposed in the upstream of head carriage 26a.

EXAMPLES

Hereinafter, the present invention will be described in more detail with reference to Examples, but it is not understood that the scope of the present invention is limited to Examples.

[Preparation of W Pigment Dispersion]

W pigment dispersion 1 was adjusted by the following procedure. The following two compounds were put into a stainless beaker, and stirred and dissolved for 1 hour while heating on a hot plate at 65° C.

(Pigment Dispersant) 9 parts by weight of PB824 (manufactured by Ajinomoto Fine-Techno Co., Inc.)

(Photocurable Compound) 71 parts by weight of tripropylene glycol diacrylate (APG-200, manufactured by Shin-Nakamura Chemical Co., Ltd.)

After cooling to room temperature, 60 parts by weight of titanium oxide (TCR-52 manufactured by Sakai Chemical Industry Co., Ltd.) as a pigment was added thereto, and put, together with 200 g of zirconia beads having a diameter of 0.5 mm, into a glass bottle, and the glass bottle was tightly stoppered. After a dispersing treatment was performed by a paint shaker for 5 hours, the zirconia beads were removed.

W pigment dispersion 2 was prepared in the same manner as in W pigment dispersion 1 except that PB824 as the pigment dispersant was replaced with BYKJET-9151 (manufactured by BYK-Chemie GmbH) as a block copolymer having tertiary amine.

[Preparation of Y Pigment Dispersion]

Y pigment dispersion was adjusted by the following procedure. The following two compounds were put into a stainless beaker, and stirred and dissolved for 1 hour while heating on a hot plate at 65° C.

(Pigment Dispersant) 9 parts by weight of PB824 (manufactured by Ajinomoto Fine-Techno Co., Inc.)

(Photocurable Compound) 71 parts by weight of tripropylene glycol diacrylate (APG-200 manufactured by Shin-Nakamura Chemical Co., Ltd.)

After cooling to room temperature, 20 parts by weight of Pigment Yellow 180 (Chromofine Yellow 6280JC manufactured by Dainichiseika Color & Chemicals Mfg. Co., Ltd.) as a pigment was added thereto, and put, together with 200 g of zirconia beads having a diameter of 0.5 mm, into a glass bottle, and the glass bottle was tightly stoppered. After a dispersing treatment was performed by a paint shaker for 5 hours, the zirconia beads were removed.

[Preparation of M Pigment Dispersion]

M pigment dispersion was prepared in the same manner as in Y pigment dispersion except that the pigment was replaced with Pigment Red 122 (Chromofine Red 6112JC manufactured by Dainichiseika Color & Chemicals Mfg. Co., Ltd.).

[Preparation of C Pigment Dispersion]

C pigment dispersion was prepared in the same manner as in Y pigment dispersion except that the pigment was replaced with Pigment Blue 15:4 (Chromofine Blue 6332JC manufactured by Dainichiseika Color & Chemicals Mfg. Co., Ltd.).

[Preparation of K Pigment Dispersion]

K pigment dispersion was prepared in the same manner as in Y pigment dispersion except that the pigment was replaced with Pigment Black 7 (#52 manufactured by Mitsubishi Chemical Corporation).

[Preparation of Ink]

The following components and the above pigment dispersions were mixed according to respective compositions described in Tables 2 to 4 below, and heated to 80° C. and stirred. The resulting solutions were filtered by a 3-μm Teflon (registered trademark) membrane filter manufactured by ADVANTEC Co., Ltd., to provide Y, M, C and K inks, and W inks 1 to 13. The unit in each component in the Tables is represented by "mass %".

[Gelling Agent]
(Gelling Agent A)
Lauric acid amide (Diamid Y: manufactured by Nippon Kasei Chemical Co., Ltd., C12)
Ethylene glycol distearate (EMALEX EG-di-S: manufactured by Nihon Emulsion Co., Ltd., C18-C18)
(Gelling Agent A (G1))
Distearyl ketone (KAO Wax T1: manufactured by Kao Corporation, C18-C18)
(Gelling Agent A (G2))
Behenyl behenate (UNISTAR M-2222SL: manufactured by NOF Corporation, C21-C22)
(Additional Gelling Agent)
Glycerin monocaprylate (POEMM200: Riken Vitamin Co., Ltd., C10)
[Photocurable Compound]
(Photocurable Compound A)
3PO modified trimethylolpropane triacrylate (Miramer M360: manufactured by Miwon Specialty Chemical, molecular weight: 471, C log P: 4.9)
(Additional Photocurable Compound)
Polyethylene glycol #400 diacrylate (NK ester A-400: manufactured by Shin-Nakamura Chemical Co., Ltd., molecular weight: 508, C log P: 0.5)
6EO modified trimethylolpropane triacrylate (SR499: manufactured by SARTOMER, molecular weight: 560, C log P: 3.6)
[Pigment Dispersant]
(Block Copolymer Having Tertiary Amine)
BYKJET-9151 (manufactured by BYK-Chemie GmbH)
(Additional Pigment Dispersant)
PB824 (manufactured by Ajinomoto Fine-Techno Co., Inc.)
[Polymerization Inhibitor]
Irgastab UV10 (manufactured by BASF SE)
[Photoinitiator]
Photoinitiator 1: TPO (manufactured by BASF SE)
Photoinitiator 2: Irg819 (manufactured by BASF SE)
[Surfactant]
KF-352 (Shin-Etsu Chemical Co., Ltd.)

TABLE 2

| Ink composition | | W Ink 1 | W Ink 2 | W Ink 3 | W Ink 4 | W Ink 5 | W Ink 6 | W Ink 7 |
|---|---|---|---|---|---|---|---|---|
| Gelling agent A | Distearyl ketone | 1.5% | | | 0.5% | | 2.0% | 2.0% |
| | Behenyl behenate | | 0.5% | | | | | |

TABLE 2-continued

| | Ink composition | W Ink 1 | W Ink 2 | W Ink 3 | W Ink 4 | W Ink 5 | W Ink 6 | W Ink 7 |
|---|---|---|---|---|---|---|---|---|
| | Lauric acid amide | | 0.9% | 5.0% | | | | |
| | Ethylene glycol distearate | | | | | 1.0% | 3.0% | |
| Additional gelling agent | Glycerin monocaprylate | | | | | | | |
| Photocurable compound A | 3PO modified trimethylolpropane triacrylate | 15.0% | | | 15.0% | | | 15.0% |
| Additional photocurable compound | Polyethylene glycol #400 diacrylate | 20.0% | 20.0% | 20.0% | 20.0% | 20.0% | 20.0% | 20.0% |
| | 6EO modified trimethylolpropane triacrylate | 30.5% | 27.9% | 32.5% | 42.6% | 44.5% | 45.5% | 30.5% |
| Additive | Polymerization inhibitor | 0.1% | 0.1% | 0.1% | 0.1% | 0.1% | 0.1% | 0.1% |
| | Photoinitiator 1 | 6.0% | 6.0% | 6.0% | 6.0% | 6.0% | 6.0% | 6.0% |
| | Photoinitiator 2 | 3.0% | 3.0% | 3.0% | 3.0% | 3.0% | 3.0% | 3.0% |
| | Surfactant | 0.1% | 0.1% | 0.1% | 0.1% | 0.1% | 0.1% | 0.1% |
| Pigment dispersion | W pigment dispersion 1 | | 42.0% | 33.3% | | 23.3% | 23.3% | 23.3% |
| | W pigment dispersion 2 | 23.3% | | | 11.7% | | | |
| | Total | 100.0% | 100.0% | 100.0% | 100.0% | 100.0% | 100.0% | 100.0% |
| | Amount of gelling agent in ink | 2.0% | 0.9% | 5.0% | 1.5% | 3.0% | 2.0% | 2.0% |
| | Amount of titanium oxide in ink | 10.0% | 18.0% | 14.3% | 5.0% | 10.0% | 10.0% | 10.0% |
| | Gelling agent A/Titanium oxide | 20.0% | 5.0% | 35.0% | 33.0% | 30.0% | 20.0% | 20.0% |

TABLE 3

| | Ink composition | W Ink 8 | W Ink 9 | W Ink 10 | W Ink 11 | W Ink 12 | W Ink 13 |
|---|---|---|---|---|---|---|---|
| Gelling agent A | Distearyl ketone | | | 5.5% | 2.0% | | |
| | Behenyl behenate | | 0.4% | | | | |
| | Lauric acid amide | | | | | | |
| | Ethylene glycol distearate | 0.9% | | | | | |
| Additional gelling agent | Glycerin monocaprylate | | | | | 3.0% | |
| Photocurable compound A | 3PO modified trimethylolpropane triacrylate | 30.0% | 30.0% | 15.0% | 15.0% | 15.0% | 15.0% |
| Additional photocurable compound | Polyethylene glycol #400 diacrylate | 10.0% | 10.0% | 20.0% | 20.0% | 20.0% | 20.0% |
| | 6EO modified trimethylolpropane triacrylate | 5.6% | 27.1% | 17.0% | 42.1% | 29.5% | 20.8% |
| Additive | Polymerization inhibitor | 0.1% | 0.1% | 0.1% | 0.1% | 0.1% | 0.1% |
| | Photoinitiator 1 | 6.0% | 6.0% | 6.0% | 6.0% | 6.0% | 6.0% |
| | Photoinitiator 2 | 3.0% | 3.0% | 3.0% | 3.0% | 3.0% | 3.0% |
| | Surfactant | 0.1% | 0.1% | 0.1% | 01% | 0.1% | 0.1% |
| Pigment dispersion | W pigment dispersion 1 | | | | | | |
| | W pigment dispersion 2 | 44.3% | 23.3% | 33.3% | 11.7% | 23.3% | 35.0% |
| | Total | 100.0% | 100.0% | 100.0% | 100.0% | 100.0% | 100.0% |
| | Amount of gelling agent in ink | 0.9% | 0.4% | 5.5% | 2.0% | 3.0% | 0.0% |
| | Amount of titanium oxide in ink | 19.0% | 10.0% | 14.3% | 5.0% | 10.0% | 15.0% |
| | Gelling agent A/Titanium oxide | 4.7% | 4.0% | 38.5% | 40.0% | 0.0% | 0.0% |

TABLE 4

| | Ink composition | Y Ink | M Ink | C Ink | K Ink |
|---|---|---|---|---|---|
| Gelling agent | Distearyl ketone | 3.0% | 3.0% | 3.0% | 3.0% |
| Photocurable compound B | 3PO modified trimethylolpropane triacrylate | 15.0% | 30.0% | 15.0% | 15.0% |
| Additional photocurable compound | Polyethylene glycol #400 diacrylate | 20.0% | 10.0% | 20.0% | 20.0% |
| | 6EO modified trimethylolpropane triacrylate | 37.8% | 32.8% | 37.8% | 37.8% |
| Additive | Polymerization inhibitor | 0.1% | 0.1% | 0.1% | 0.1% |
| | Photoinitiator | 6.0% | 6.0% | 6.0% | 6.0% |
| | Photoinitiator | 3.0% | 3.0% | 3.0% | 3.0% |
| | Surfactant | 0.1% | 0.1% | 0.1% | 0.1% |
| Pigment dispersion | Y Pigment dispersion (pigment concentration 20.0%) | 15.0% | | | |
| | M Pigment dispersion (pigment concentration 20.0%) | | 15.0% | | |
| | C Pigment dispersion (pigment concentration 20.0%) | | | 15.0% | |
| | K Pigment dispersion (pigment concentration 20.0%) | | | | 15.0% |
| | Total | 100.0% | 100.0% | 100.0% | 100.0% |

[Inkjet Image Forming Method]

Each ink set of ink compositions Y, M, C and K, and W ink 1 prepared was installed in a line type inkjet recording apparatus having an inkjet recording head provided with a piezoelectric inkjet nozzle.

An ink supply system was configured from an ink tank, an ink channel, a sub ink tank located immediately before the inkjet recording head, a pipe provided with a filter, and a piezo head, and was warmed so that the temperature of a portion from the ink tank to the head section was 100° C. and the temperature of a conveyance stage for a recording medium was 40° C.

(Inkjet Image Forming Method 1 (White Top Coating))

After K ink was used to form a 100% solid image of 50×200 mm in size on a transparent PET (polyethylene terephthalate) roll having a width of 300 mm and a thickness of 50 W ink 1 was used to form a 100% solid image of 100×200 mm in size such that the solid image was superposed with the image formed by K ink, and such inks were cured within 5 seconds thereafter by exposure to ultraviolet rays described later. Herein, one recording head for discharging 6 to 42 pl of multiple droplets and providing a resolution of 360 dpi was used with respect to each color to perform discharge at a resolution of 360×360 dpi, and the drive waveform and the voltage were adjusted such that the coating weight of K ink was 9.5 g/m$^2$ and the coating weight of W ink was 10.0 g/m$^2$.

(Inkjet Image Forming Method 2 (White Primer Coating))

An image was formed in the same manner as in image forming method 1 except that the order of inks to be attached was exchanged and W ink was used to form a 100% solid image 100×200 mm in size, and then K ink was used to form a 100% solid image of 50×200 mm in size such that the solid image was superposed with W ink previously attached.

(Inkjet Image Forming Method 3)

An image was formed in the same manner as in image forming method 2 except that the recording medium was replaced with A4-sized aluminum metallized paper (Haipika #75F manufactured by Tokushu Tokai Holdings Co., Ltd.).

Herein, Y ink, M ink and C ink were not discharged from inkjet heads in all the inkjet image forming methods.

(Light Exposure Method)

Each ink was cured by irradiation with light from an ultraviolet irradiation unit (LED lamp manufactured by Phoseon Technology) (395 nm, 4 W/cm$^2$, water cooled unit). The accumulated amount of light was appropriately adjusted by the change in conveyance speed of the recording medium so as to be 600 mJ/cm2, and measured by using an UV power meter C9536, H9958 manufactured by Hamamatsu Photonics K. K.

[Measurement of Light Transmittance]

A region of the image sample output in each of the image forming methods, where W ink and K ink were attached with being superposed, was utilized, and the light transmittance of the image sample at 395 nm was measured with an UV-VIS spectrometer (V-650, manufactured by JASCO Corporation). In the measurement, an integrating sphere (ISV-722 manufactured by JASCO Corporation) was used in combination.

[Evaluation Methods of Image]

(Smoothness of W Ink)

The surface roughness of the image sample output was measured by using a non-contact three-dimensional profilometer (WYKO NT9300 manufactured by Veeco Instruments Inc.) under conditions including a VSI system and a magnification of 5 (1.3×0.9 mm), and evaluated according to the following criteria.

A: arithmetic mean roughness Ra was 50 nm or more and less than 150 nm

B: arithmetic mean roughness Ra was 150 nm or more and less than 250 nm

C: arithmetic mean roughness Ra was 250 nm or more and less than 350 nm

D: arithmetic mean roughness Ra was 350 nm or more

* Rating "C" or higher was determined as having no problem in practical use (Curability)

A region of the image sample output, where W ink and K ink were attached with being superposed, was scrubbed with coated paper under a load of 500 g for 30 times, then visually observed, and evaluated according to the following criteria.

A: no change in image at all

B: slight reduction in image density, but no problem in practical use

C: reduction in image density

D: remarkable reduction in image density

* Rating "B" or higher was determined as having no problem in practical use (Color Mixing)

A region of the image sample output, where a white image and a black image were superposed, was used, and the front and back surfaces thereof were visually observed, and evaluated according to the following criteria.

B: difference in color between the front and back surfaces could be clearly identified without any mixing of W ink and K ink superposed.

C: W ink and K ink superposed were partially mixed.

D: W ink and K ink superposed were fully mixed.

* Rating "B" was determined as having no problem in practical use (Glossiness)

The glossiness value at 60° of the surface of the image sample output was measured by using a glossmeter (PG-II, Nippon Denshoku Industries Co., Ltd.), and evaluated according to the following criteria.

B: glossiness at 60° was 30 or more and less than 60

C: glossiness at 60° was 20 or more and less than 30, or 60 or more and less than 90

D: glossiness at 60° was less than 20, or 90 or more

* Rating "C" or higher was determined as having no problem in practical use

The evaluation results are shown in Table 5 to Table 6.

TABLE 5

| Ink | Image forming method | Light transmittance at 395 nm | Image quality evaluation | | | | Note |
|---|---|---|---|---|---|---|---|
| | | | Smoothness | Curability | Color mixing | Glossiness | |
| W Ink 1 | 1 | 1.7% | A | A | B | B | Example 1 |
| W Ink 2 | 1 | 1.0% | C | B | B | C | Example 2 |
| W Ink 3 | 1 | 1.0% | C | B | B | C | Example 3 |
| W Ink 4 | 1 | 1.7% | A | A | B | B | Example 4 |
| W Ink 5 | 1 | 1.0% | C | B | B | C | Example 5 |

TABLE 5-continued

| Ink | Image forming method | Light transmittance at 395 nm | Smoothness | Curability | Color mixing | Glossiness | Note |
|---|---|---|---|---|---|---|---|
| W Ink 6 | 1 | 1.3% | B | B | B | C | Example 6 |
| W Ink 7 | 1 | 1.5% | A | A | B | C | Example 7 |

TABLE 6

| Ink | Image forming method | Light transmittance at 395 nm | Smoothness | Curability | Color mixing | Glossiness | Note |
|---|---|---|---|---|---|---|---|
| W Ink 8 | 1 | 1.2% | B | B | D | C | Comparative Example 1 |
| W Ink 9 | 1 | 1.2% | B | B | D | C | Comparative Example 2 |
| W Ink 10 | 1 | 0.3% | D | D | B | C | Comparative Example 3 |
| W Ink 11 | 1 | 0.3% | D | D | B | C | Comparative Example 4 |
| W Ink 12 | 1 | 0.8% | D | D | C | C | Comparative Example 5 |
| W Ink 13 | 1 | 2.0% | A | B | D | D | Comparative Example 6 |
| W Ink 1 | 2 | 1.7% | A | A | B | B | Example 8 |
| W Ink 1 | 3 | 1.7% | A | A | B | B | Example 9 |

It was found that the light transmittance at 395 nm was changed in correlation with the smoothness of W ink in Examples 1 to 9 and Comparative Examples 1 to 6. That is, it is presumed that, as the smoothness of W ink is higher, the light transmittance at 395 nm is increased to result in an increase in the amount of light reaching the inside of W ink, thereby enhancing curability. The results in Examples 1 to 9 are derived from the ink and the image forming method according to one aspect of the present invention, and a desired image quality can be achieved.

The smoothness of W ink is found to correlate with the mixing ratio of the gelling agent/titanium oxide. For example, in comparison of Example 1 with Comparative Example 2, and Example 2 with Comparative Example 1, when the amount of titanium oxide was larger than that of the gelling agent (when the ratio of the gelling agent/titanium oxide was less than 5.0 mass %), satisfactory smoothness was achieved, but color mixing was remarkably observed. This indicated that gelation of the ink was insufficient. In addition, in comparison of Example 3 with Comparative Example 3, and Example 4 with Comparative Example 4, when the amount of the gelling agent was larger than that of titanium oxide (when the ratio of the gelling agent/titanium oxide was more than 35 mass %), it was found that significant deterioration in smoothness was caused and also reduction in the light transmittance at 395 nm was caused. On the other hand, in Examples 1 to 7 according to one aspect of the present invention, the ratio of the gelling agent/titanium oxide was in the range of 5 mass % or more and 35 mass % or less, and it was found that the smoothness of W ink was enhanced when the ratio was in such a range.

In comparison of Examples 1 and 4 with Examples 2, 3 and 5, it was indicated that the structure of the gelling agent to be used was preferably a structure represented by any of Formulas (G1) and (G2) because such a structure could impart higher smoothness. That is, it is presumed that, since the crystalline form of the gelling agent to be precipitated is a plate-like form, a surface relatively low in irregularity is easily formed even if crystals are localized on the ink surface.

In addition, it was indicated from comparison of Example 6 with Example 7 that the ink containing photocurable compound A having high lipophilicity represented by the C log P value was preferable because higher smoothness was achieved.

In addition, it was found from comparison of Example 1 with Example 7 that, when the pigment dispersant was a comb-shaped block copolymer having tertiary amine, the glossiness was in a more preferred range.

In Comparative Example 5 where the gelling agent to be used did not fall within the present invention and Comparative Example 6 where no gelling agent was contained, a desired image quality could not be achieved. In particular, in Comparative Example 6, it was found that, while high smoothness and curability were achieved, color mixing was remarkably caused because no gelling agent was contained.

It was found that at least one of the effects of the present invention was exerted also in Example 8 where the order of attachment of inks in the image forming method was reversed from that in Example 1. It was found that, even when the recording medium was a medium other than a film as in Example 9, at least one of the effects of the present invention was again exerted.

INDUSTRIAL APPLICABILITY

The actinic radiation-curable inkjet ink according to one aspect of the present invention can be used as, for example, inks for top coating or primer coating in formation of an image using other color inks.

The present application claims the priority based on Japanese Patent application No. 2014-253207 filed on Dec.

15, 2014, and the contents described in the specification, claims and drawings of such an application are herein incorporated.

REFERENCE SIGNS LIST 10, 20 inkjet recording apparatus
12 recording medium
14, 24 recording head for ink discharge
16, 26 head carriage
18, 28 light irradiation section
19 temperature control section
27 guide section

The invention claimed is:

1. An actinic radiation-curable inkjet ink comprising:
a photocurable compound,
a photoinitiator,
a gelling agent,
a white pigment, and
a pigment dispersant,
wherein the white pigment comprises titanium oxide, the gelling agent comprises gelling agent A comprising a $C_{12}$ to $C_{26}$ alkyl chain in a straight-chain moiety, and a content of the gelling agent A relative to a content of the titanium oxide is 5 mass % to 35 mass %,
wherein the photocurable compound comprises photocurable compound A which is (meth)acrylate having a molecular weight of 280 to 1,500 and a C log P value of 4.0 to 7.0, and is present in an amount of 10 mass % to 40 mass % relative to a total mass of the inkjet ink, and
wherein the pigment dispersant comprises a comb-shaped block copolymer comprising a straight chain polymer having a tertiary amine as a main chain and a side chain grafted onto each monomer unit of the main chain.

2. The actinic radiation-curable inkjet ink according to claim 1, wherein the gelling agent A comprises at least one compound of compounds represented by Formulas (G1) and (G2) below:

$$R^1\text{—CO—}R^2 \quad \text{Formula (G1):}$$

$$R^3\text{—COO—}R^4 \quad \text{Formula (G2):}$$

wherein $R^1$ to $R^4$ each independently represent an alkyl group comprising a $C_{12}$ to $C_{26}$ straight-chain moiety and optionally further comprising a branched moiety.

3. An inkjet image forming method comprising attaching the actinic radiation-curable inkjet ink according to claim 1 as a white ink onto a recording medium through discharge from a recording head for ink discharge; and irradiating the attached actinic radiation-curable inkjet ink with actinic radiation.

4. The inkjet image forming method according to claim 3, further comprising attaching a color ink developing a color other than white onto a recording medium.

5. The inkjet image forming method according to claim 4, wherein the color ink is an actinic radiation-curable inkjet ink comprising a photocurable compound, a photoinitiator and a colorant, the method comprising:
attaching a first ink which is one of the white ink and the color ink onto a region of a recording medium on which an image is to be formed, through discharge from a recording head for ink discharge;
further attaching a second ink which is the other of the white ink and the color ink onto a region of the recording medium onto which the first ink is attached, through discharge from a recording head for ink discharge, while the first ink attached onto the recording medium is not cured; and
irradiating a region of the recording medium onto which the first ink and the second ink are attached, with actinic radiation.

6. The inkjet image forming method according to claim 5, wherein the white ink is attached onto a region of a recording medium on which an image is to be formed, through discharge from a recording head for ink discharge, and
the color ink is further attached on a region of the recording medium onto which the white ink is attached, through discharge from a recording head for ink discharge.

7. The inkjet image forming method according to claim 5, wherein the color ink is attached onto a region of a recording medium on which an image is to be formed, through discharge from a recording head for ink discharge, and
the white ink is further attached onto a region of the recording medium onto which the color ink is attached, through discharge from a nozzle of a recording head for ink discharge.

8. A recording medium, on which an image is formed by using the actinic radiation-curable inkjet ink according to claim 1.

* * * * *